United States Patent
Kolb et al.

(10) Patent No.: US 6,733,906 B2
(45) Date of Patent: May 11, 2004

(54) MAGNETIC RECORDING MEDIA HAVING SPECIFIC WET THICKNESS AND COATING METHODS

(75) Inventors: William Blake Kolb, Woodbury, MN (US); Gary L. Huelsman, St. Paul, MN (US)

(73) Assignee: Imation Corp., Oakdale, CA (US)

( * ) Notice: Subject to any disclaimer, the term of this patent is extended or adjusted under 35 U.S.C. 154(b) by 0 days.

(21) Appl. No.: 09/917,442

(22) Filed: Jul. 27, 2001

(65) Prior Publication Data

US 2002/0150792 A1 Oct. 17, 2002

Related U.S. Application Data

(60) Provisional application No. 60/221,067, filed on Jul. 27, 2000.

(51) Int. Cl.[7] .................................................. B23B 5/16
(52) U.S. Cl. ........................ 428/694 BS; 428/694 BR; 428/336; 428/337; 428/900
(58) Field of Search ................. 428/337, 336, 428/328, 329, 694 R, 695, 900, 694 BS, 694 BR

(56) References Cited

U.S. PATENT DOCUMENTS

| | | | |
|---|---|---|---|
| 2,761,419 A | 9/1956 | Mercier et al. | |
| 3,782,947 A | 1/1974 | Krall | |
| 4,113,903 A | 9/1978 | Choinski | |
| 4,203,769 A | 5/1980 | Guestaux | |
| 4,242,400 A | * 12/1980 | Smith et al. | |
| 4,731,292 A | 3/1988 | Sasaki et al. | |
| 4,784,907 A | 11/1988 | Matsufuji et al. | |
| 4,784,914 A | 11/1988 | Matsufuji et al. | |
| 4,837,045 A | 6/1989 | Nakajima | |
| 4,842,900 A | 6/1989 | Miyamoto | |
| 4,844,946 A | * 7/1989 | Komatsu et al. | |
| 4,854,262 A | 8/1989 | Chino et al. | |
| 4,984,533 A | 1/1991 | Takahashi et al. | |
| 5,030,484 A | 7/1991 | Chino et al. | |
| 5,034,271 A | 7/1991 | Miyoshi et al. | |
| 5,072,688 A | 12/1991 | Chino et al. | |
| 5,083,524 A | 1/1992 | Hiraki et al. | |
| 5,099,786 A | 3/1992 | Shibata et al. | |
| 5,108,787 A | 4/1992 | Hiraki et al. | |
| 5,119,757 A | 6/1992 | Chino et al. | |
| 5,165,999 A | 11/1992 | Ushimaru et al. | |
| 5,203,922 A | 4/1993 | Shibata et al. | |

(List continued on next page.)

FOREIGN PATENT DOCUMENTS

| | | |
|---|---|---|
| EP | 0 603 582 B1 | 2/1997 |
| WO | WO 98/43746 | 10/1998 |

OTHER PUBLICATIONS

*Introduction to Organic Chemistry*, Andrew Streitwieser Jr. and Clayton H. Heathcock, McMillian Publishing Co., Inc. (NY, NY 1976), pp. 947–949.

"On the Difference of Three Die Coating Methods: History and Characteristics of Die Coating Methods," Kimiaka Miyamoto, 10th International Coating Science and Technology Symposium, Technical Session 5: Coating Fundamentals, Sep. 26, 2000, Scottsdale, Arizona.

*Primary Examiner*—H. Thi Le
(74) *Attorney, Agent, or Firm*—Eric D. Levinson

(57) ABSTRACT

A method is provided for coating one or more fluid layers on a substrate to form magnetic recording media such as magnetic tape and diskettes. The method takes advantage of fluid coating formulations having a particular rheology that enables the coating of one or more magnetic layers with reduced thicknesses while achieving increased coating speeds. With proper rheology, one or more layers can be coated on a substrate traveling at increased speeds while maintaining desired coating thicknesses.

79 Claims, 8 Drawing Sheets

U.S. PATENT DOCUMENTS

| | | | |
|---|---|---|---|
| 5,258,231 A | | 11/1993 | Okita et al. |
| 5,294,525 A | | 3/1994 | Yamauchi et al. |
| 5,384,162 A | * | 1/1995 | Takahashi et al. |
| 5,395,743 A | | 3/1995 | Brick et al. |
| 5,413,900 A | | 5/1995 | Yokota |
| 5,447,782 A | * | 9/1995 | Inaba et al. |
| 5,496,607 A | | 3/1996 | Inaba et al. |
| 5,501,903 A | | 3/1996 | Erkkila et al. |
| 5,510,187 A | | 4/1996 | Kumar et al. |
| 5,514,528 A | | 5/1996 | Chen et al. |
| 5,525,376 A | * | 6/1996 | Leonard |
| 5,593,734 A | | 1/1997 | Yuan et al. |
| 5,597,680 A | | 1/1997 | Wang et al. |
| 5,681,687 A | | 10/1997 | Lelental et al. |
| 5,709,985 A | | 1/1998 | Morrison et al. |
| 5,712,345 A | | 1/1998 | Erkkila et al. |
| 5,725,665 A | | 3/1998 | Yapel et al. |
| 5,735,969 A | | 4/1998 | Lown et al. |
| 5,756,272 A | | 5/1998 | Landry-Coltrain et al. |
| 5,759,666 A | | 6/1998 | Carlson et al. |
| 5,763,046 A | | 6/1998 | Ejiri et al. |
| 5,763,076 A | | 6/1998 | Coons, III et al. |
| 5,784,914 A | | 7/1998 | Ciani |
| 5,798,136 A | | 8/1998 | Landry-Coltrain et al. |
| 5,804,360 A | | 9/1998 | Schell et al. |
| 5,821,027 A | | 10/1998 | Landry-Coltrain et al. |
| 5,834,174 A | | 11/1998 | Smith et al. |
| 5,837,324 A | | 11/1998 | Yapel et al. |
| 5,843,530 A | | 12/1998 | Jerry et al. |
| 5,846,699 A | | 12/1998 | Wang et al. |
| 5,849,363 A | * | 12/1998 | Yapel et al. |
| 5,853,819 A | | 12/1998 | Lelental et al. |
| 5,861,195 A | | 1/1999 | Bhave et al. |
| 5,866,312 A | | 2/1999 | Wang et al. |
| 5,928,726 A | * | 7/1999 | Butler et al. |
| 5,998,549 A | | 12/1999 | Milbourn et al. |
| 6,007,874 A | * | 12/1999 | Bhave et al. |
| 6,012,327 A | | 1/2000 | Seth et al. |
| 6,033,723 A | * | 3/2000 | Kistler et al. |
| 6,120,853 A | | 9/2000 | Naruse et al. |
| 6,139,982 A | | 10/2000 | Bottomley et al. |
| 6,207,223 B1 | * | 3/2001 | Komatsu et al. |
| 6,214,530 B1 | | 4/2001 | Morrison et al. |
| 6,265,032 B1 | * | 7/2001 | Kurose et al. |
| 6,284,361 B1 | * | 9/2001 | Kobayashi et al. |
| 6,355,405 B1 | * | 3/2002 | Ludemann et al. |
| 6,372,302 B1 | * | 4/2002 | Kurose et al. |

* cited by examiner

MAGNETIC RECORDING MEDIA HAVING SPECIFIC WET THICKNESS AND COATING METHODS

This application claims priority from U.S. Provisional Application Serial No. 60/221,067, filed Jul. 27, 2000, and entitled "MAGNETIC RECORDING MEDIA AND COATING METHODS," the entire content of which is incorporated herein by reference.

TECHNICAL FIELD

The invention relates to coating methods and, more particularly, to methods for coating fluid layers on a moving web to form magnetic recording media such as magnetic tape and diskettes.

BACKGROUND

Data storage media such as magnetic tape and diskettes typically are manufactured by coating one or more magnetic layers on a substrate, and then drying the resultant coating to form a film. For manufacturing reasons, the substrate ordinarily takes the form of a moving web that is transported relative to a generally fixed coating apparatus.

In an effort to store increased amounts of information, it is desirable to provide higher density magnetic recording media. Higher storage density can be achieved by including increased amounts of magnetic particles in the magnetic layer, adding additional magnetic layers, using thinner layers, or providing magnetic particles capable of increased data storage density.

The substrate may be provided with a subbing layer that is typically situated between the substrate and the magnetic recording layer. A subbing layer can promote adhesion between the substrate and the magnetic recording layer, whether the media contains one or more magnetic recording layers. Thus, a magnetic recording medium may contain a subbing layer and one or more magnetic recording layers thereon, resulting in a multi-layer construction.

Producing magnetic recording media with a multi-layer construction typically has involved sequential coating and drying steps, adding one layer during each coating application. Existing coating techniques include roll coating, gravure coating, extrusion coating, and a combination thereof, to name a few. These types of coating methods are generally insufficient when it is desirable to coat all layers in a single step in the production of a multi-layer construction.

Although multi-layer coating techniques exist, characteristics of the magnetic layer composition pose difficulties. In particular, the relatively high viscosity of typical magnetic coating compositions, as well as potential aggregation of the magnetic particles within the magnetic coating composition, can undermine the effectiveness of existing multi-layer coating techniques. Coating difficulties can become even more significant when the speed of the web is increased, the thickness of the magnetic layer is decreased, or both.

SUMMARY

The invention is directed to magnetic recording media such as magnetic tape and diskettes. A coating method takes advantage of fluid coating formulations having a particular rheology that enables the coating of one or more magnetic layers with reduced thicknesses while achieving increased coating speeds. With proper rheology, one or more layers can be coated on a substrate traveling at increased speeds while maintaining desired coating thicknesses and quality.

The method may enable increased coating speeds by providing an enlarged coating window and reduced layer thicknesses that produce reduced drying loads. Notably, the method can be used to coat multiple layers of reduced thickness simultaneously, offering increased manufacturing throughput and improved magnetic recording performance.

In further embodiments, the method can produce multiple layers with both reduced thickness and improved coating uniformity, contributing to enhanced recording performance and increased recording density. Increased surface uniformity between coated layers, in particular, can provide reduced modulation and improved recording performance.

The reduced coating thicknesses also can reduce the so-called thickness loss that occurs as a function of increased thickness when short wave magnetic recording techniques are used. Thickness loss can be avoided even though dispersions of magnetic particles in a binder system are used, rather than vapor deposition, to achieve desired coating thicknesses.

In addition, the use of fluid coating techniques such as slide coating produces reduced loading force on the substrate, permitting the use of thinner substrates. Thinner substrates also contribute to a reduction in thickness loss. Further, in the case of magnetic tape, reduced layer and substrate thicknesses promote reduced tape thickness that may permit more tape for a given tape pack volume and, consequently, higher storage capacity.

A method in accordance with the invention preferably makes use of slide coating techniques for simultaneous delivery of multiple layers to the substrate, although other coating techniques may be useful. Slide coating is a method for multi-layer coating, i.e., it involves simultaneous coating of a plurality of fluid layers onto a substrate. The different fluids forming the multiple layers flow out of multiple slots that open out onto an inclined plane. The fluids flow down the plane, across the coating gap and onto an upward moving substrate. The fluids generally do not mix on the plane, across the coating gap, or on the web, so that the final coating is composed of distinct superposed layers.

Careful selection of coating formulation rheology, in accordance with the invention, provides a slide coating method with an enlarged coating window, i.e., a wider range of coating speeds and thicknesses. Viscosity in high shear rate regions, e.g., at the coating bead, determines coatability and defines maximum coating speed. Viscosity in intermediate shear rate regions, e.g., on the slide coater, governs layer thickness as the coating composition flows down the slide surface. Viscosity in low shear rate regions, e.g., following application of the coating on the substrate, determines mobility of the coating and resistance to defects in the drying zone.

Proper rheology of the coating formulation permits the coating of extremely thin films at high speeds with minimal coating defects in the finished magnetic media product. Generally, as speed increases, coating thickness must increase to stay within the coating window. As speed increases beyond a critical point, however, it has been found that coating thickness can actually be decreased with higher speeds. In particular, as speed increases, inertia that begins to dominate other forces, thereby permitting decreased coating thicknesses.

Reduced drying load due to reduced coating thicknesses in the coating system may enable higher web speeds and the use of smaller, less costly drying ovens. If desired, multiple coating layers can be applied in a single pass, permitting ready incorporation of different functional layers in the coated product, e.g., different layers for magnetic recording, head cleaning, antistatic, lubrication, and the like. To further improve coating performance, one or more saturation techniques may be used to prevent premature drying of highly evaporative solvents used to coat the substrate. As one example, a boundary layer saturator may be provided to produce a saturated environment adjacent the coating gap. The saturated environment reduces drying caused by the boundary layer of air carried into the coating gap by the moving substrate.

As another example, a slide coating face saturator can be provided to produce a saturated environment at the leading face of the coater, adjacent to the coating gap, to reduce drying of dispersion that accumulates on the face. In addition, a slide surface saturator can be provided to reduce drying of coating solution on the slide ramp surface. For each saturator, a saturated environment can be provided by introducing solvent vapor into the pertinent area.

The solvent vapor can be introduced using a variety of introduction devices including pressurized feeds, evaporation pans, and the like. In one embodiment, the solvent vapor may be introduced using a wicking or capillary material that uses capillary forces, i.e., surface tension, to draw solvent into the coating region and drive the solvent to the surface of the material. At the surface of the wicking material, the solvent evaporates into the coating region. The use of a capillary material may be advantageous as the introduction of solvent vapor is less disruptive to the surface of the coated substrate. In particular, whereas pressurized feeds may create currents that disrupt the surface of the coating, and create patterns that produce defects in the coated substrate, the evaporated solvent from a capillary material is less likely to cause defects.

In one embodiment, the invention provides a magnetic recording medium comprising a substrate, a first fluid-coated layer formed over the substrate, and a second fluid-coated layer formed over the first layer using a wet-on-wet multi-layer slide coating process, the second layer containing metal magnetic recording particles, wherein the first and second layers are coated with a combined average wet thickness on the substrate of less than approximately 25 micrometers.

In another embodiment, the invention provides a magnetic recording medium comprising a substrate, a first fluid-coated layer formed over the substrate, and a second fluid-coated layer formed over the first layer using a wet-on-wet multi-layer slide coating process, the second layer containing metal magnetic recording particles, wherein the second fluid-coated layer has a thickness on the substrate of less than approximately 3 micrometers.

In an added embodiment, the invention provides a magnetic recording medium comprising a substrate, a first fluid-coated layer formed over the substrate, and a second fluid-coated layer formed over the first layer using a wet-on-wet multi-layer slide coating process, the second layer containing metal magnetic recording particles, wherein the second fluid-coated layer has a thickness of less than approximately 0.4 micrometers and an average inter-layer roughness of less than approximately 10 nm.

In a further embodiment, the invention provides a magnetic recording medium comprising a substrate, a fluid-coated first layer formed over the substrate, a fluid-coated second layer formed over the first layer using a wet-on-wet multi-layer slide coating process, and a fluid-coated third layer formed over the second layer using a wet-on-wet multi-layer slide coating process, the third layer containing a magnetic recording material, wherein the first, second, and third layers have a combined thickness of less than approximately 3 micrometers.

In another embodiment, the invention provides a magnetic recording medium comprising a substrate having a thickness of less than 8 micrometers, a fluid-coated first layer formed over the substrate, a fluid-coated second layer formed over the first layer using a wet-on-wet multi-layer slide coating process, and a fluid-coated third layer formed over the second layer using a wet-on-wet multi-layer slide coating process, the third layer containing a magnetic recording material, wherein the first, second, and third layers have a combined thickness of less than approximately 3 micrometers.

The details of one or more embodiments of the invention are set forth in the description below. Other features, objects, and advantages of the invention will be apparent from the description, and from the claims.

BRIEF DESCRIPTION OF THE DRAWINGS

Like reference numbers and designations in the various drawings indicate like elements.

DETAILED DESCRIPTION

Figure 1:
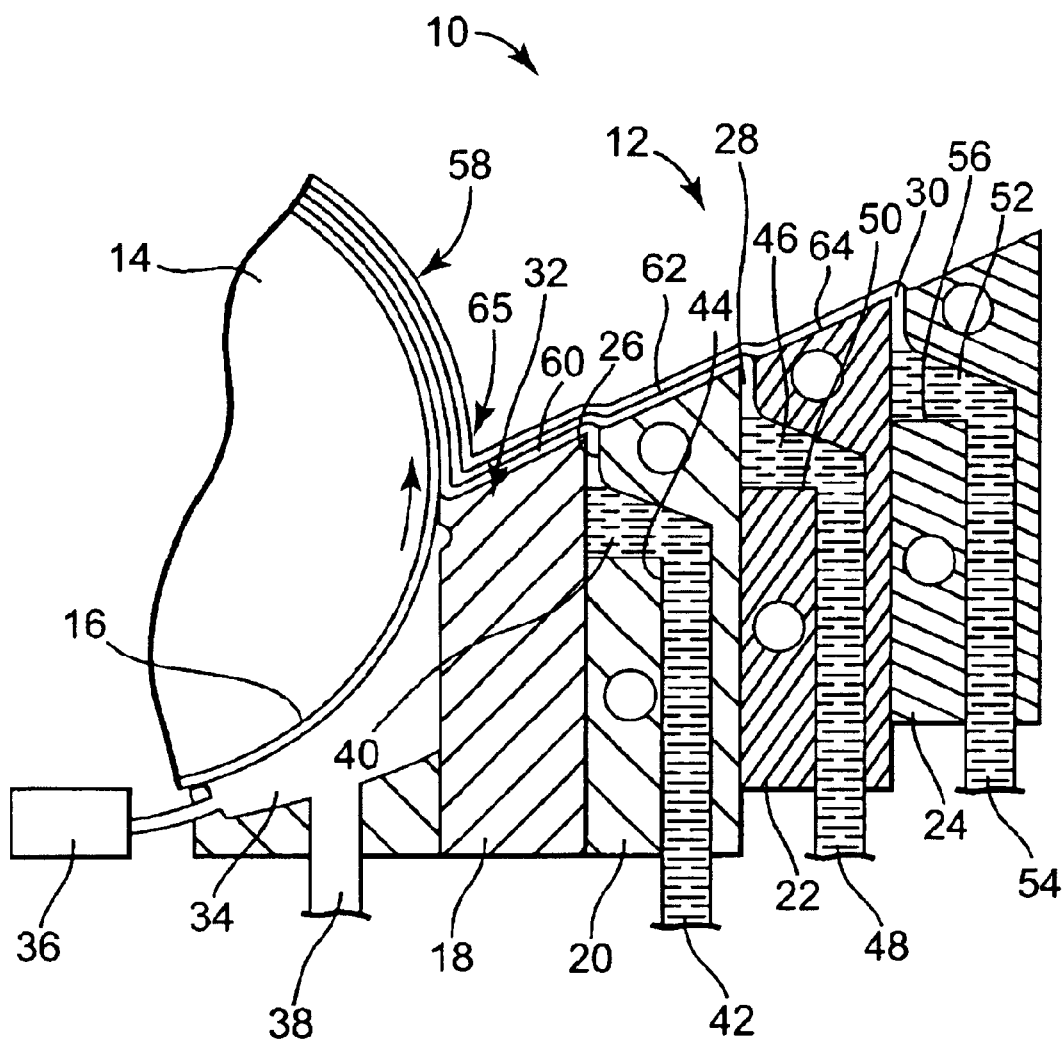
FIG. 1 is a side sectional view of a slide coating apparatus.
Figure 2:
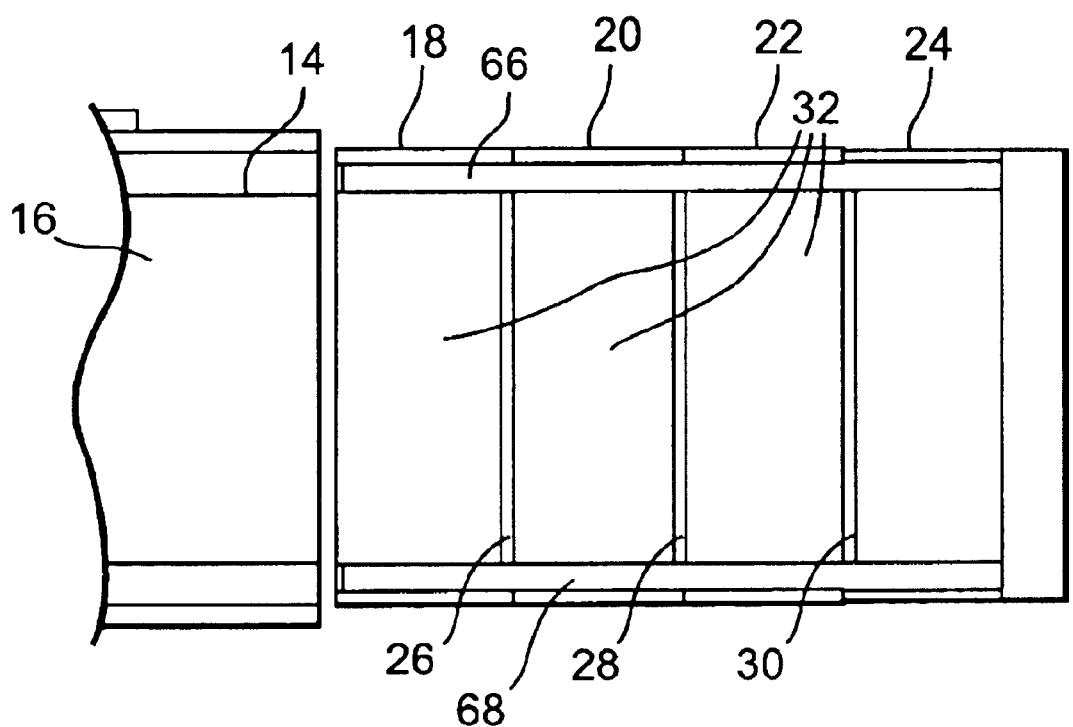
FIG. 2 is a partial top view of the slide coater shown in FIG. 1.

FIG. 1 is a diagram of a slide coating apparatus 10 suitable for practice of a coating method in accordance with the invention. FIG. 2 is a partial top view of slide coating apparatus 10. Slide coating apparatus 10 includes a slide coater 12. A backup roller 14 can be provided proximate slide coater 12 to support a coating substrate 16 in the form of a web. Substrate 16 can be transported relative to slide coater 12 between supply and takeup rolls (not shown in FIG. 1). Slide coater 10 can simultaneously coat two or more fluid layers in a stacked arrangement onto substrate 16. Following coating, the layers are dried.

Existing slide coating processes are generally described in U.S. Pat. No. 2,761,419 to Mercier et al., U.S. Pat. No. 5,861,195 to Bhave et al., and Modern Coating and Drying Technology, E. D. Cohen and E. B. Gutoff, VCH Publishers, 1992, the entire content of each being incorporated herein by reference. With coating fluids having appropriate rheology, in accordance with the invention, slide coating apparatus 10 can be adapted to coat fluid layers with reduced thickness and at higher coating speeds relative to the existing slide coating processes. As a result, slide coating apparatus 10 can facilitate the high-throughput manufacture of magnetic recording media having reduced thicknesses and improved magnetic properties.

As shown in FIG. 1, slide coater 12 may conform substantially to existing slide coaters, such as that described in the aforementioned Bhave et al. patent. For example, slide coater 12 may include multiple slide blocks 18, 20, 22, 24. In the embodiment of FIG. 1, slide coater 12 includes four slide blocks for coating three layers. In other embodiments, slide coater 12 may include a single slide block or more than four slide blocks depending on the number of fluid layers to be coated onto substrate 16. In some embodiments, for example, the recording medium to be manufactured may include only a single recording layer.

Slide blocks 18, 20, 22, 24 define fluid slots 26, 28, 30, respectively, and a combined slide surface 32. With further reference to FIG. 1, first slide block 18 is disposed adjacent back-up roller 14, while slide blocks 20, 22, 24 are disposed upward from the first slide block 18. Slide blocks 18, 20, 22 define a continuous slide surface for flow of coating fluids. A vacuum box 34 can be provided to adjust the level of negative pressure adjacent slide coating apparatus 10. In particular, vacuum box 34 serves to maintain a differential pressure across the coating bead between slide surface 32 and substrate 16, thereby stabilizing the coating bead. Vacuum box 34 may be coupled to a vacuum source 36 and include an outlet 38 for material recovered from the coating area. A hood (not shown in FIG. 1) may enclose the upper portion of slide coater 12 and cover the slide surfaces of slide blocks 18, 20, 22.

A first fluid 40 can be distributed to first slot 26 via a first fluid supply 42 and a first manifold 44. A second fluid 46 can be distributed to second slot 28 via a second fluid supply 48 and a second manifold 50. Optionally, a third fluid 52 can be distributed to the third fluid slot 30 via a third fluid supply 54 and a third fluid manifold 56. Thus, in an embodiment as shown in FIG. 1, slide coater 12 is capable of coating a three-layer fluid construction 58 that includes a first fluid layer 60 containing first fluid 40, a second fluid layer 62 containing second fluid 46, and a third fluid layer 64 containing third fluid 52.

In other embodiments, two fluid layers 60, 62 may suffice. First fluid layer 60 can be coated onto substrate 16, with second fluid layer 62 being coated above the first fluid layer, and third fluid layer 64 being coated above the second fluid layer. In this arrangement, backup roller 14 rotates in the direction of travel of substrate 16. In some embodiments, first fluid layer 60 may be preceded by a primer layer that is either applied to substrate 16 in advance of the coating of the first fluid layer, or applied as part of the multi-layer coating process with the first fluid layer 60, second fluid layer 62 and third fluid layer 64.

First fluid layer 60 may act as a carrier or "subbing" layer for second and third fluid layers 62, 64. In this case, the wet thickness of first fluid layer 60 on substrate 16 may be substantially more than the wet thicknesses of second and third fluid layers 62, 64, respectively. The wet thickness of each layer 60, 62, 64 is the average cross-substrate thickness on the surface of coated substrate 16 at a point substantially removed from the coating bead, but close enough that appreciable drying has not yet occurred. In FIG. 1, the coating bead is indicated by reference numeral 65.

As shown in FIG. 2, the widths of fluid slots 26, 28, 30 in a direction transverse to the direction of flow of fluid layers 60, 62, 64 may be substantially commensurate with the width of substrate 16. Slide blocks 18, 20, 22 may be slightly wider than fluid slots 26, 28, 30. In some embodiments, the width of substrate 16 may be on the order of 6 to 30 inches (15.24 cm to 76.2 cm). Preferably, for increased manufacturing throughput, the width of substrate 16 is greater than or equal to approximately 12 inches (30.5 cm).

In producing magnetic tape media, substrate 16 may be slit length-wise in several strips, e.g., one-quarter inch (0.64 cm) in width, to produce continuous lengths of recording tape for loading into data cartridges. In producing magnetic disk media, disks can be cut or punched from substrate 16 as "cookies," e.g., 3.5 inches (90 mm) in diameter, for loading into floppy diskette housings. In either case, each fluid layer 60, 62, 64 preferably extends width-wise to the lateral edges of substrate 16.

In some embodiments, second fluid 46 contains magnetic material. In this case, once dried, second fluid layer 62 forms a magnetic recording layer on substrate 16. In other embodiments, the magnetic material can be provided in first fluid layer 60, or in multiple fluid layers 60, 62, 64 of fluid construction 58. For example, multiple layers in fluid construction 58 may form multiple magnetic recording layers. Alternatively, individual magnetic layers can be arranged to work together as a composite multi-layer recording film. In an exemplary embodiment, however, second fluid layer 62 contains magnetic material and functions as a single magnetic recording layer. The magnetic material may take the form of metal magnetic recording particles.

Third fluid 52 for optional third fluid layer 64 may contain a variety of different substances that contribute to the functional properties of the finished magnetic recording medium. In other words, once dried, third fluid layer 64 may form a functional layer of the magnetic recording medium. For example, third fluid 52 may contain antistatic material, abrasive material that aids the cleaning of recording heads during use, lubricating materials that reduce friction between the magnetic recording head and the surface of the magnetic recording medium, or a combination thereof.

Additional slide blocks can be added to slide coater 12 for the introduction of additional fluid layers, as desired for media performance, ease of coatability, or productivity. Thus, such functional materials can be incorporated in discrete fluid layers. Alternatively, one or more functional materials can be incorporated in a single fluid that, when dried, forms a multi-functional layer in the resulting magnetic recording medium. Exemplary formulations for fluid layers 60, 62, 64 are described in detail below.

Figure 3:
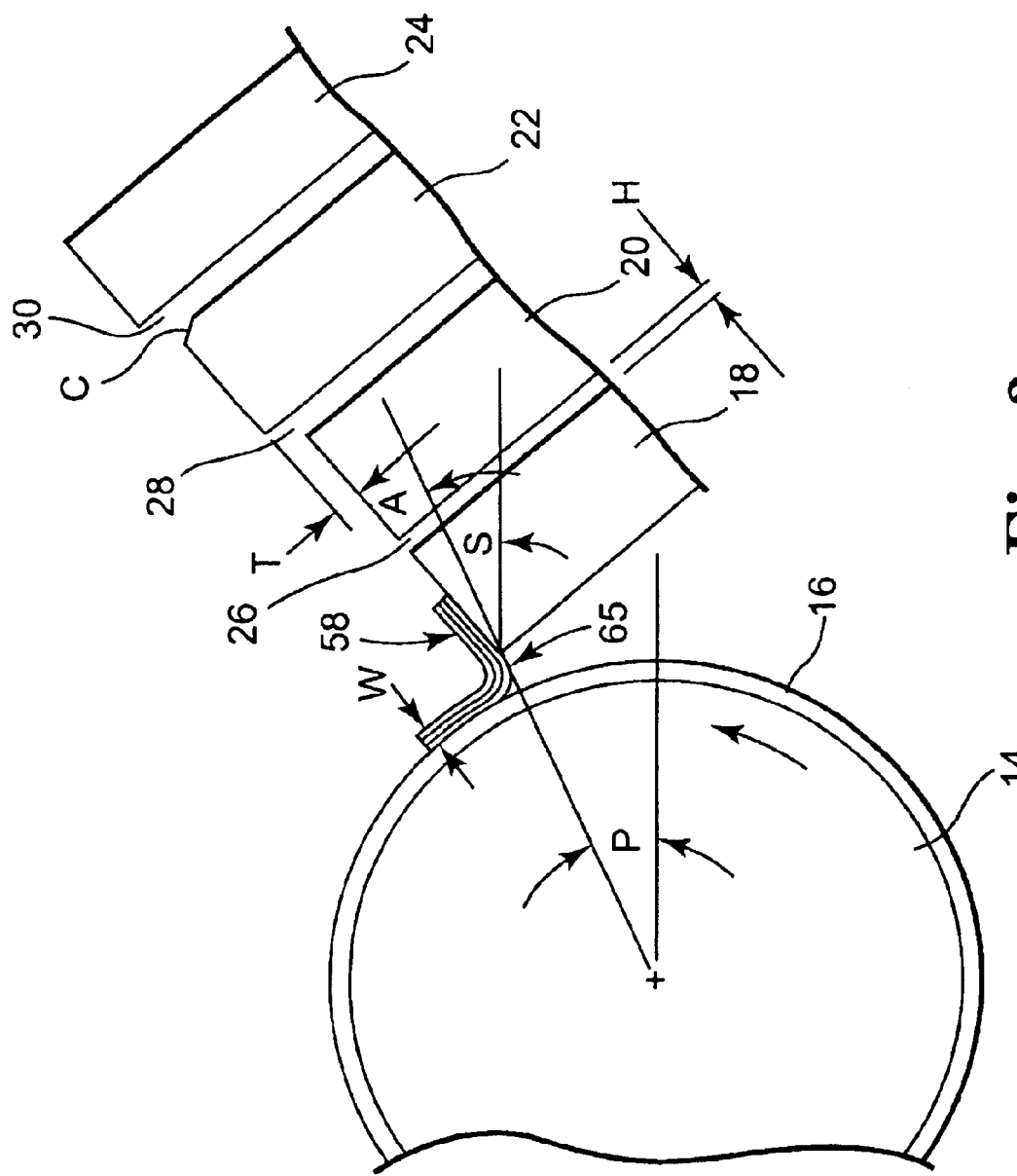
FIG. 3 is a partial side sectional view of the slide coater shown in FIG. 2.

FIG. 3 is a partial side sectional view of slide coater 12 shown in FIG. 1. Fluid manifolds 44, 50, 56 can be designed to allow uniform width-wise distribution of fluids 40, 46, 52 out of fluid slots 26, 28, 30, respectively. The design of manifolds 44, 50, 56 is specific to the choice of slot height H for slots 26, 28, 30, as illustrated in FIG. 2. As is well known in the art, the slot height H is made sufficiently small such that the pressure drop in the slot is much higher than the pressure drop across the manifold without causing undue problems of non-uniformity due to machining limitations or bar deflection due to excessive pressure in the die slot. This ensures that the fluid distributes substantially uniformly in the slot.

The design of each of fluid manifolds 44, 50, 56 also can be made specific to the rheology of the fluid that it will carry, taking into account the material properties associated with the fluid. The fluid supply can be located either at the end of the respective fluid manifold 44, 50, 56 for an end-fed design or at the center of the fluid manifold for a center-fed design. The principles of manifold and slot design are well-documented. See, e.g., Gutoff, "Simplified Design of Coating Die Internals," Journal of Imaging Science and Technology, 1993, 37(6), pages 615–627. Such design principles can be used for a variety of die-fed coating processes such as slide, extrusion, and curtain coating. Although slide coating is preferred, other coating processes may take advantage of the coatability advantages afforded by a coating process in accordance with the invention.

Slide blocks 18, 20, 22, 24 can be configured to have specific slot heights H as depicted in FIG. 3 to minimize pressure in manifolds 44, 50, 56 and to overcome problems of non-uniformity due to machining limitations. Thus, slots 26, 28, 30 may have slot heights appropriate to produced desired fluid layers with desired wet thicknesses (or even desired dry thicknesses). In the event more than three slide blocks are employed, the heights of other slots can be determined according to the desired thickness of the corresponding layer on substrate 16.

In one embodiment, the height used for first slot 26 may be sufficient, given the rheology of first fluid 40 and characteristics of manifold 44, to produce a first fluid layer 60 having an average wet thickness of less than approximately 25 micrometers and, in some embodiments, approximately 10 to 25 micrometers, given a substrate speed of greater than or equal to approximately 400 feet per minute (approximately 120 meters per minute). In accordance with the invention, such wet thicknesses can be readily achieved for substrate speeds on the order of 600 to 850 feet per minute (approximately 180 to 260 meters per minute), and, in some cases, greater speeds.

The height of second slot 28 may be sufficient, given the rheology of second fluid 46 and characteristics of manifold 50, to produce a second fluid layer 62 having an average dry thickness of approximately 0.04 to 0.4 micrometers given a substrate speed of approximately 600 to 850 feet per minute (183 to 260 meters per minute). Second fluid layer 62 may have a wet thickness in the range of approximately 0.5 to 5 micrometers. The wet thicknesses of second and third fluid layers 62, 64 can be generally less than the wet thickness of first fluid layer 60. Thus, the average wet thickness of the overall multi-layer coating formulation may be on the order of the average wet thickness of first fluid layer 60, i.e., approximately 10 to 25 micrometers. In some embodiments, single- or dual-layer coating formulations can be used in lieu of the tri-layer formulation 58 described with reference to FIGS. 1–3. In this case, to promote coatability, the single or dual layers can be selected to produce an overall average wet coating thickness on the order of approximately 10 to 25 micrometers.

Slide blocks 18, 20, 22, 24 also can be arranged with a level offset so as to result in slot steps T, as also depicted in FIG. 3. Steps T can aid the uniform flow of fluid down the slide surface by minimizing the possibility of flow separation and fluid recirculation zones that can lead to streaking and other media defects. Another method of minimizing the occurrence of flow separation on the slide surface is by machining chamfers C on the downstream side of a fluid slot, as further shown in FIG. 3.

In the machining of slide blocks 18, 20, 22, 24, the finish of the block edges that form the edges of the fluid slots 26, 28, 30 is important, as is the front edge of first slide block 18 adjacent to backup roller 14. The presence of nicks, burrs or other defects on these edges can lead to streaking defects in the finished product. In order to avoid such defects, the edges can be polished to a finish of less than 8 microinches (0.02 micrometers). Details regarding a procedure for finishing the die edges are disclosed in U.S. Pat. No. 5,861,195 to Bhave et al., the entire content of which is incorporated herein by reference.

FIG. 3 illustrates the orientation of slide coater 12 relative to back-up roller 14, including the position angle P, attack angle A, and the slide angle S. The slide angle S is the sum of the position angle P and the attack angle A. A negative position angle P is preferred so as to allow for increased wrap on the back-up roller and greater stability for the coating operation. However, the method could also be used with a zero or positive position angle.

The slide angle S determines the stability of the flow of fluids down the inclined slide plane. A large slide angle S can lead to the development of surface wave instabilities and consequently coating defects. The distance between slide coater 12 and backup roller 14 at the point of closest approach is known as the gap.

FIG. 3 further illustrates the wet thickness W of layers 60, 62, 64. Again, wet thickness refers to the thickness of the coating on the surface of coated substrate 16 substantially far away from coated bead 65, but close enough before appreciable drying has occurred. Once solvent within layers 60, 62, 64 begins to evaporate, the coating thickness will decrease further. Most of the solvent will be removed in the drying zone, however, after which point the coating thickness will exhibit a dry thickness that is substantially less than the wet thickness.

During drying, the fluid layers 60, 62, 64 can be subjected to a magnetic field that serves to align magnetic particles residing in one or more of the layers in a desired orientation. With a wet thickness of approximately 10 to 25 micrometers, a coating formulation constructed in accordance with the invention may exhibit a dry thickness of less than approximately 3 micrometers and, more particularly, approximately 1 to 3 micrometers. The dry thickness refers to the average cross-substrate thickness of the multiple layers 60, 62, 64 after substrate 16 has passed through the drying zone but before the substrate has been subjected to calendaring, i.e., before surface treatment with a pressure nip, to compress the coating.

As further shown in FIG. 2, flow of fluid down the slide surfaces defined by slide blocks 18, 20, 22, 24 can be aided by the use of edge guides 66, 68 at each edge 12 of slide coater 12. Edge guides 66, 68 serve to confine the solution to the slide surfaces, resulting in a fixed width of coating on substrate 16, and also stabilizing the flow of fluid at the edges. Each of edge guides 66, 68 preferably is straight, and directs flow perpendicular to slots 26, 28, 30 over the slide surfaces. Exemplary edge guides are described in the aforementioned U.S. Pat. No. 5,861,195 to Bhave et al. and U.S. Pat. No. 5,837,324 to Yapel et al., incorporated herein by reference. Edge guides 66, 68 can be made of metal materials such as steel, aluminum, and the like, polymeric materials such as polytetrafluoroethylene, polyamide, polymethylene oxide, or polyacetal and the like, or wood, ceramic, and the like. Alternatively, edge guides 66, 68 can be made of more than one material such as steel coated with a polymer, e.g., polytetrafluoroethylene. Along with edge guides 66, 68, a cover or shroud (not shown) can be placed over slide coater 12.

Figure 4:
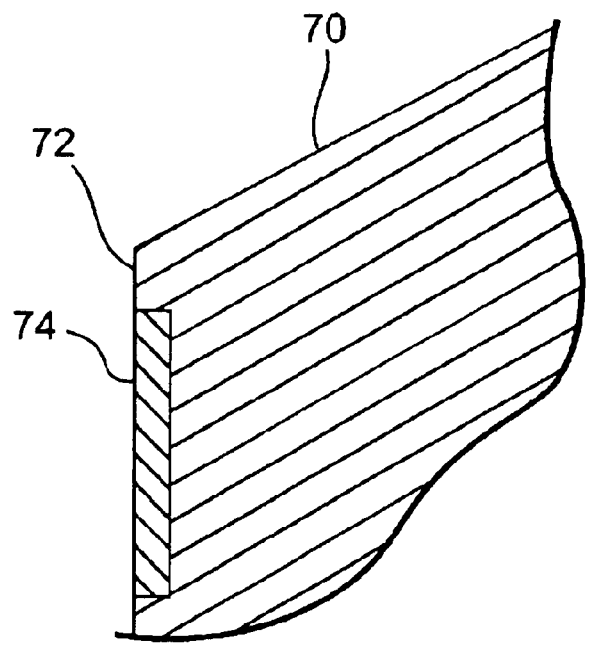
FIG. 4 is a partial side sectional view of an alternative slide block for a slide coating apparatus as shown in FIG. 1.

FIG. 4 is a partial side sectional view of an alternative slide block 70. Slide block 70 may conform substantially to first slide block 18 shown in FIGS. 1–3. In the embodiment of FIG. 4, however, a front edge 72 of slide block 70 may include a low surface energy member 74 that extends across the width of the front edge. Low surface energy member 74 provides surface energy properties that prevent build-up of dried coating material. Front edge 74 is particularly susceptible to build-up of such material. Low surface energy member 74, in effect, repels coating material, causing it to remain with coating bead 65 or fall into vacuum box 34 (shown in FIG. 1) rather than dry on slide block 70. Details regarding a process for making suitable low surface energy materials are disclosed in U.S. Pat. No. 5,998,549 to Milbourn et al., which is incorporated herein by reference. The Milbourn et al. patent describes, for example, the use of polymeric compounds having a fluorochemical oligomer that includes pendent fluoroaliphatic groups, pendent organic-solubilizing groups, and pendent groups reacted with an epoxy-silane.

Materials formulated as described in the Milbourn et al. patent may be useful in producing low surface energy member 74. More preferably, however, low surface energy member 74 is made of a glass material that is coated with low surface energy materials as described in the Milbourn et al. patent. In particular, the glass material preferably is silica-based, and preferably not polymeric, although PTFE material may be useful in some applications. The glass material can be cut into a plate-like insert that is fitted into a recess or otherwise attached to front edge 72 of slide block 70 as low surface energy member 74. Advantageously, as the low surface energy material wears away, or otherwise becomes less effective, the glass insert forming low surface energy member 74 can be replaced. Alternatively, the low surface energy material can be reapplied to glass member 74 to restore its low surface energy properties to a more uniform level. For example, the lower surface energy material can be sprayed, wiped, roll-coated or otherwise deposited onto glass member 74, thereby restoring the uniformity of the coating and its effectiveness. This approach can avoid streaks and other defects caused by the drying of coating materials on front edge 72, while enabling periodic rejuvenation for longer coating life.

Figure 5:
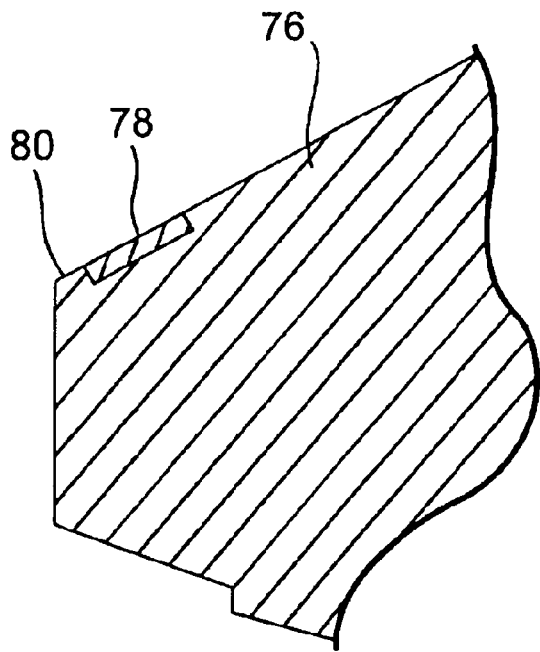
FIG. 5 is a partial side sectional view of another alternative slide block for a slide coating apparatus as shown in FIG. 1.

FIG. 5 is a partial side sectional view of another alternative slide block 76. Slide block 76 may conform substantially to any of slide blocks 18, 20, 22, 24 shown in FIGS. 1–3. Slide block 76 may further include, however, a low surface energy member 78 adjacent an upper front edge 80 of the slide block. In some embodiments, it may be desirable to place low surface energy member 78 at edge 80. Like low surface energy member 74, described with reference to FIG. 4, low surface energy member 78 may take the form of a sheet of non-polymeric, silica glass manufactured as a plate-like insert for positioning in a recess in the slide block 76. Like low surface energy member 74, member 78 can prevent buildup of dried coating material on upper front edge 80 of slide block 76, thereby preserving coating uniformity and quality.

Figure 6:
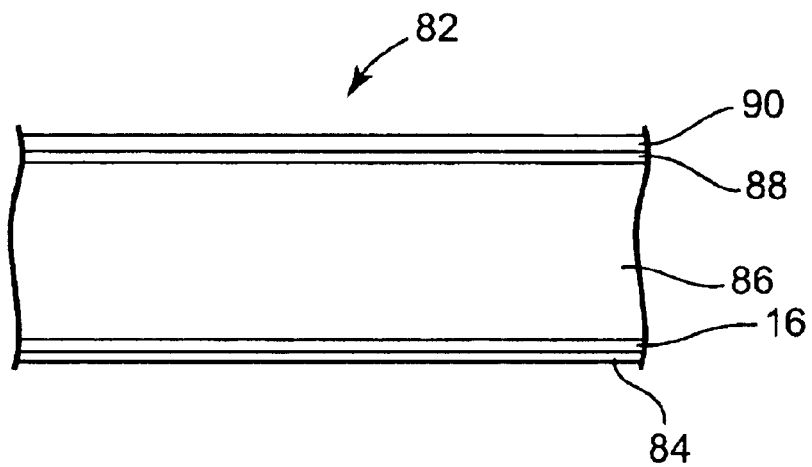
FIG. 6 is a cross-sectional view of a magnetic recording medium formed by a multi-layer coating method.

FIG. 6 is a cross-sectional view of a magnetic recording medium 82 formed by a multi-layer coating method in accordance with the invention. As shown in FIG. 6, magnetic recording medium 82 may include substrate 16, a backing layer 84, a subbing layer 86 formed, upon drying, by first fluid layer 60, a recording layer 88 formed, upon drying, by second fluid layer 62, and a functional layer 90 formed, upon drying, by third fluid layer 64. Functional layer 90 may include, for example, head cleaning, antistatic, lubrication, and other materials performing like functions. Using slide coating apparatus 10, layers 86, 88, 90 can be formed simultaneously by application of multi-layer coating formulation 58 onto substrate 16 in a single pass of the substrate web. Backing layer 84 can be applied to substrate 16 before the coating run for application of fluid layers 60, 62, 64.

In accordance with the invention, fluid layers 60, 62, 64, and resultant layers 86, 88, 90 of magnetic recording medium 82 can be made extremely thin by carefully controlling the rheology of the fluid compositions. At the same time, the rheology can be exploited to promote faster coating speeds. For example, with a rheology as described herein, it is possible to achieve extremely thin coatings at substrate speeds in excess of approximately 400 feet/minute (120 meters/minute). In some applications, speeds in the range of approximately 600 to 850 feet/minute (183 to 260 meters/minute) can be achieved, while maintaining desired coating layer thickness.

Figure 7:
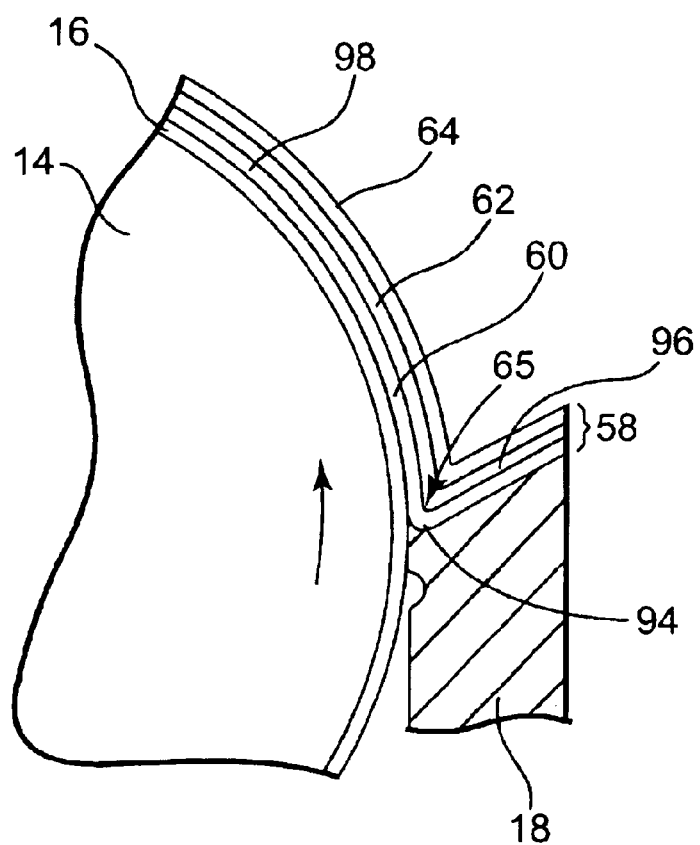
FIG. 7 is an enlarged cross-sectional view of a coating bead formed by a slide coating apparatus as shown in FIG. 1.

FIG. 7 is an enlarged cross-sectional view of coating bead 65 formed by a slide coating apparatus 10 as shown in FIG. 1. At coating bead 65, fluid layers 60, 62, 64 jump across the minute gap between first slide block 18 and substrate 16, and abruptly change direction as they are carried upward by the movement of the substrate. As fluid layers 60, 62, 64 are carried away from first slide block 18, they are drawn down onto substrate 16 and experience shear thinning at coating bead 65. With proper rheology of first fluid layer 60, in particular, fluid layers 60, 62, 64 can be coated with reduced thicknesses while substrate 16 is transported at increased speeds.

In general, it is desirable that first fluid layer 60 exhibit a low wet viscosity at higher shear rates, a moderate wet viscosity at moderate shear rates, and a higher wet viscosity at lower shear rates. Lower viscosity in the high shear region at coating bead 65 is desirable to promote adherence of first fluid layer 60 to substrate 16, and thereby support formation of the coating bead across the gap between first slide block 18 and the substrate. Moderate viscosity in the moderate shear regions, e.g., on slide coater 12 and adjacent coating bead 65, is desirable to promote interlayer separation and coating bead integrity.

Higher viscosity in the low shear regions, e.g., on substrate 16, is desirable for resistance of the multi-layer coating formulation to mobility defects such as moire, banding, and mottle that can result in the drying process. Mobility is generally proportional to the wet layer coating thickness squared and inversely proportional to viscosity. Thus, lower viscosities and heavier wet layers can result in such defects, especially when coating data storage tape products that are characterized by extremely thin substrates that can be easily deformable and exhibit high heat transfer rates to the coating. Particular ranges of wet viscosity versus shear rate capable of reducing defects in the drying process in accordance with the invention are described below.

The rheology of first fluid layer 60 is most important in producing the desired coating window. First fluid layer 60, in effect, acts as a carrier layer for second and third fluid layers 62, 64, and has a major impact on the overall fluid characteristics of multi-layer coating formulation 58. The coating formulation experiences a wide range of shear rates during different processes. In general, the processes can be divided into three steps: fluid preparation and delivery, coating, and solidification. In fluid preparation and delivery, the coating formulation experiences higher shear rates. Also, at the dynamic coating line, higher shear rates are applied to the coating formulation. During drying, the fluid coating formulation solidifies and experiences relatively low shear rates on the moving substrate.

Hence, the coating solution rheology can be characterized in terms of three different regions. In a first, high shear rate region, shear rates are on the order of 10,000 sec$^{-1}$ or greater. Shear rates of this magnitude are associated with the coating bead, i.e., the dynamic wetting line, as well as many flows within the dispersion preparation and delivery systems, e.g., mills, microfluidizers, and pumps. This region, to a large extent, governs the coatability of the solutions, defining the coating window in terms of coating gap and applicable vacuum pressure and determining maximum coating speed.

In a second, moderate shear rate region, shear rates are on the order of 5 to 10,000 sec$^{-1}$. In this region, shear rates are associated with the flow of the coating formulation within the coating die manifold or along the inclined surface of a slide coater. In addition, such shear rates may be associated with many flows in the solution preparation and delivery systems. This region governs die design and configuration. In slide coating, for example, this region influences manifold geometry and dimensions, slot heights, slot lengths, and step heights, as well as the film thickness of the solution flowing down an inclined slide surface to the coating bead. If thickness is nonuniform in either the down-web or cross-web direction, the resulting magnetic recording product may not pass stringent product specifications for tape performance such as modulation and output.

In a third, low shear rate region, shear rates are on the order of 0 to 5 sec$^{-1}$. In this region, shear rates of this magnitude are associated with the bulk of the coated solution after it has been deposited on the moving substrate 16. In other words, shear rates in this region are associated with the wet liquid film. Solution viscosity should be greater than a critical value that is a function of the wet film thickness, convection dry air velocities, substrate speed, the substrate path, substrate support and steering, and substrate properties. Mobility is a function of solution viscosity and wet film thickness, and governs how susceptible the liquid film is to disturbances such as air motion, roller surfaces, substrate imperfections and static.

In the coating of magnetic media, viscosity in the low shear rate region can be particularly important. Magnetic media, such as tape, typically make use of extremely thin substrates. Reducing the thickness of the substrate is one way to increase storage capacity for a given magnetic particle. As the substrate thickness becomes increasingly thinner, mobility-induced defects in the coating formulation become more of a concern. For example, thin films are more susceptible to flexure and troughing under tension and easily flutter from speed and tension variations and air motion, e.g., ambient currents, enclosure flows, and drying oven convection. In addition, thin films are easily deformed by contact with supporting and steering devices such as idler rolls, vacuum rolls, and air turns. If the level of viscosity in the coating formulation is insufficient, deformation of the extremely thin films used for magnetic recording applications can produce mobility-induced defects. In accordance with the invention, thinner substrates on the order of less than 8 micrometers can be used, as will be described.

Accordingly, viscosity characteristics in each of the three general shear rates regions described above are important for achieving coatability and coating quality. In accordance with the invention, first fluid layer 60 may have a wet viscosity of approximately 4 to 10 cp at a shear rate of approximately 9,000 to 11,000 sec$^{-1}$, i.e., in a relatively high shear rate region, and approximately 20 to 150 cp at a shear rate of approximately 75 to 100 sec$^{-1}$, i.e., in a relatively moderate shear rate region. An example of a high shear rate region 94 is indicated in FIG. 7. A moderate shear rate region is indicated by reference numeral 96 in FIG. 7. In a lower shear rate region, e.g., as indicated by reference numeral 98 in FIG. 7, the first coating formulation may have a wet viscosity of greater than or equal to approximately 50 cp at a shear rate of approximately 3 to 5 sec$^{-1}$.

In a particular embodiment, first fluid layer 60 may have a wet viscosity of approximately 5 to 8 cp at a shear rate of approximately 9000 to 11000 sec$^{-1}$, and approximately 20 to 60 cp at a shear rate of approximately 75 to 100 sec$^{-1}$, along with a wet viscosity of greater than or equal to approximately 200 cp at a shear rate of approximately 3 to 5 sec$^{-1}$. More particularly, the first coating formulation may have a wet viscosity of approximately 6 to 7 cp at a shear rate of approximately 9000 to 11000 sec$^{-1}$, and approximately 30 to 60 cp at a shear rate of approximately 75 to 100 sec$^{-1}$, along with a wet viscosity of greater than or equal to approximately 400 cp at a shear rate of approximately 3 to 5 sec$^{-1}$. In each case, the wet viscosity of the first coating formulation is selected to facilitate coating of thin fluid layers at high web speeds.

With a rheology as described above, fluid layers 60, 62, 64 can be coated with a wider coatability window in terms of both layer thickness and coating speed. The wet viscosity in the high shear rate regions, e.g., at the coating bead, is a significant factor in coatability and helps to define maximum coating speed. Viscosity in the intermediate shear rate regions, e.g., the slide coater 12, governs layer thickness as the coating composition flows down the slide surface. Viscosity in the low shear rate regions, e.g., following application of the multi-layer coating formulation 58 onto substrate 16, determines mobility of the coating and resistance to defects in the drying zone. In high shear rate regions, e.g., at the coating bead, a wet viscosity of substantially less than 4 cp can make it difficult to maintain the coating bead, while a wet viscosity of substantially more than 10 cp can trap air under the coating, resulting in significant coating nonuniformities. At the same time, in moderate shear regions, e.g., in the manifold or slot, a wet viscosity that is substantially greater than 60 cp can cause filtration problems. To provide proper coatability, the rheology of fluid layer 60 should be carefully balanced.

As substrate speed increases, the thickness of fluid layer 60 generally increases up to a point. As the substrate speed increases, however, proper coating formulation rheology permits coating thickness to decrease with higher speeds. In particular, as speed increases, the rheology of the coating formulation promotes inertia at coating bead 65 begins to dominate other forces, thereby permitting decreased coating thicknesses. Notably, with proper rheology as described herein, fluid layer 60 need not rely on viscoelasticity for coatability, but rather can take the form of a purely Newtonian coating fluid. Thus, with proper rheology, conventional magnetic particles and binder systems can be used.

Substrate 16 can be transported as a web over a wide range of web speeds. For increased throughput, however, substrate 16 preferably is transported at a speed of greater than approximately 400 feet per minute (approximately 120 meters per minute) and more preferably greater than approximately 600 feet per minute (approximately 180 meters/minute). In particular, with proper fluid rheology, speeds in the range of approximately 600 to 850 feet per minute (approximately 180 to 260 meters/minute) are contemplated with wet fluid thicknesses as described herein. The wet thicknesses of fluid layers 60, 62, 64 result in decreased drying load, facilitating the use of existing drying equipment with increased substrate. At the same time, the viscosity of fluid layers 60, 62, 64 provides resistance to convection and mobility-induced defects as substrate 16 is transported and the fluid layers are dried.

Also, with coating techniques such as slide coating, the thickness of substrate 16 can be reduced. Slide coater 12 produces a very small loading force on substrate 16, compared to other techniques such as fluid die coating and gravure coating. In particular, slide coater 12 ordinarily will produce a loading force against substrate 16 of no more than 0.05 psi (0.034 bars). In addition, in the slide coating process, substrate 16 is supported by roll 14 to thereby resist deformation. Consequently, slide coater 12 is capable of producing much less deformation of substrate 16, enabling the use of substrates with reduced thicknesses. Substrate 16 preferably has a thickness of less than or equal to approximately 8 micrometers. In some embodiments, substrate 16 may have a thickness of approximately 2 to 8 micrometers.

A thinner substrate contributes to a reduction in thickness loss for short-wave magnetic recording techniques. Moreover, for magnetic tape, reduced substrate thickness promotes significant reductions in overall tape thickness. Reductions in overall tape thickness permit more tape for a given tape pack volume and, consequently, higher storage capacity for a given data tape cartridge. Exemplary materials for construction of substrate 16 include polyethylene terephalate, polyethylene naphthalate, polyamide, polyimide, polyamide-imide, polysulfone, aramide, polyolefins, cellulose triacetate, polyvinyl chloride, and polycarbonate. The side of substrate 16 opposite the side onto which fluid layers 60, 62, 64 are coated may be pretreated with a backing layer. In addition, the side of substrate 16 onto which fluid layers 60, 62, 64 are coated may be pretreated with a primer layer.

Another important feature for magnetic recording performance is the modulation characteristic of the tape. Coating processes and materials in accordance with the invention are useful in reducing modulation and providing more uniform magnetic properties due to a more uniform magnetic layer and reduced inter-layer roughness. In particular, slide coating of materials as described herein can promote reduced interlayer roughness, producing very thin coating layers. In some embodiments, for example, the second fluid-coated layer may have a dry thickness of less than approximately 0.4 micrometers after drying.

A coating formulation suitable for use as second fluid layer 62 may have a formulation and characteristics as described below. In particular, the magnetic recording media preferably includes at least one magnetic layer formed from a magnetic coating composition comprising a binder and a plurality of magnetic particles dispersed within the binder. In addition to the at least one magnetic layer formed by second fluid layer 62, a magnetic recording medium in accordance with the invention may also include a nonmagnetic layer formed by first fluid layer 60 from a nonmagnetic coating composition comprising a binder and, optionally, nonmagnetic particles dispersed therein, and a nonmagnetic layer formed by third fluid layer 62.

As mentioned above, a magnetic coating composition suitable for formulation of second fluid layer 62 as well as a nonmagnetic coating composition suitable for formulation of first fluid layer 60 includes a binder. Suitable binders that can be used in the magnetic layer coating composition include, for example, vinyl chloride vinyl acetate copolymers, vinyl chloride vinyl acetate vinyl alcohol copolymers, vinyl chloride vinyl acetate maleic acid polymers, vinyl chloride vinylidene chloride copolymers, vinyl chloride acrylonitrile copolymers, acrylic ester acrylonitrile copolymers, acrylic ester vinylidene chloride copolymers, methacrylic ester vinylidene chloride copolymers, methacrylic esterstyrene copolymers, thermoplastic polyurethane resins, phenoxy resins, polyvinyl fluoride, vinylidene chloride acrylonitrile copolymers, butadiene acrylonitrile copolymers, acrylonitrile butadiene acrylic acid copolymers, acrylonitrile butadiene methacrylic acid copolymers, polyvinyl butyral, polyvinyl acetal, cellulose derivatives, styrene butadiene copolymers, polyester resins, phenolic resins, epoxy resins, thermosetting polyurethane resins, urea resins, melamine resins, alkyl resins, urea formaldehyde resins and the like.

The binders may be provided in a suitable non-aqueous solvent, such as methylene chloride, acetone, methyl ethyl ketone, methyl isobutyl ketone, ethyl acetate, butyl acetate, cyclohexanone, butyl alcohol, N, N-dimethylformamide, toluene, and mixtures thereof Preferred binders include polyurethanes, non-halogenated vinyl copolymers, halogenated vinyl copolymers, and a combination thereof As used herein, the term "nonhalogenated" means that the copolymer contains no covalently bound halogen atoms. Thus, the term "nonhalogenated" excludes vinyl halide monomers such as vinyl chloride or vinylidene chloride as monomeric components of the copolymer, but the term "nonhalogenated" does not exclude monomeric components such as (meth) acryloyloxyethyl trimethylammonium chloride in which chlorine is present as a chloride anion. As used herein, the prefix "(meth)acryl-" means "methacryl-" or "acryl-"The term "vinyl" with respect to a polymeric material means that the material comprises repeating units derived from vinyl monomers. As used with respect to a vinyl monomer, the term "vinyl" means that the monomer contains a moiety having a free-radically polymerizable carbon—carbon double bond. Monomers having such moieties are capable of copolymerization with each other via the carbon—carbon double bonds.

In the invention, one useful polyurethane is a carboxyl polyurethane polymer, such as that described in U.S. Pat. No. 5,759,666 (Carlson et al.). The carboxyl polyurethane polymer typically comprises the reaction product of a mixture comprising: (i) one or more polyisocyanates, (ii) a carboxylic acid functional polyol, and, (iii) optionally, one or more polyols defined to exclude the former carboxylic acid functional polyol, wherein the number of isocyanate-reactive groups present in the mixture prior to reaction exceeds the number of isocyanate groups and at least about 0.2 meq of carboxylic acid groups are present on the carboxyl polyurethane polymer per gram of carboxyl polyurethane polymer. Typically, the reaction product has a number average molecular weight from about 2000 to about 50,000, preferably from about 5000 to about 30,000.

The term "polyol," as used herein, refers to polyhydric alcohols containing an average of one or more hydroxyl groups and includes, monohydric alcohols, diols, triols, tetrols, etc. Preferred polyols are diols, that include both low molecular weight (i.e., having less than about 500 number average molecular weight) and oligomeric diols, typically having a number average molecular weight from about 500 to about 5000. Representative examples of low molecular weight diols include, but are not limited to, ethylene glycol, propylene glycol, diethylene glycol, diols having polar functional groups, diols bearing ethylenic unsaturation (e.g., 3-allyloxy-1,2-propandiol, 1-glyceryl (meth)acrylate, etc.) and fluorinated diols. Representative examples of oligomeric diols include, but are not limited to, polyether diols, polyester diols, polyether triols, and polyester triols.

The term "polyisocyanate," refers to any organic compound that has two or more reactive isocyanate (i.e., —NCO) groups in a single molecule that can be aliphatic, alicyclic, aromatic, and a combination thereof, and includes diisocyanates, triisocyanates, tetraisocyanates, etc., and a combination thereof Preferably, diisocyanates are used and include diphenylmethane diisocyanate, isophorone diisocyanate, toluene diisocyanate, hexamethylene diisocyanate, tetramethylxylene diisocyanate, p-phenylene diisocyanate, and a combination thereof.

Another useful polyurethane is a phosphonated polyurethane, such as described in U.S. Pat. No. 5,501,903 (Erkkila et al.). Preferably, the phosphonated polyurethane includes nitrogen forming part of the backbone of the polymer, a single bond or divalent linking group (preferably including up to 4 linear carbon atoms), and two pendant groups independently selected from the group of an alkyl group, a cycloalkyl group, an aryl group, or together comprise the necessary carbon atoms to complete a ring. The phosphonated polyurethane is preferably formed by reaction of a soft segment diol in which the hydroxyl groups are separated by a flexible chain (typically having a molecular weight of more than 300, and includes a polycaprolactone diol, for example), a hard segment diol in which the hydroxyl groups are separated by a relatively inflexible chain (typically having a molecular weight of less than 300, and includes neopentyl glycol, for example), a triol (e.g., a polycaprolactone triol), a diisocyanate (e.g., toluene diisocyanate, 4,4-diphenylmethane diisocyanate, and isophorene diisocyanate), and a dialkyl phosphonate (e.g., diethyl bis-(2-hydroxyethyl) aminomethylphosphonate).

An example of a useful quaternary ammonium-containing polyurethane is a polymeric quaternary ammonium compound described in U.S. Pat. No. 5,759,666 (Carlson et al.). In particular, polymeric quaternary ammonium compounds preferably have a number average molecular weight greater than about 500, preferably selected from the group of a quaternary ammonium polyurethane, a quaternary ammonium functional non-halogenated vinyl copolymer, and a combination thereof In the invention, a suitable binder may include a quaternary ammonium functionality.

As used herein, the term "quaternary ammonium functionality" refers to moieties of the formula

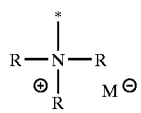

In the formula above, the bond denoted with the asterisk is attached to the backbone of the polymeric binder resin either directly or indirectly through a difunctional linking group; each R may independently be any suitable moiety or co-member of a ring structure, and is preferably H or an alkyl group of 1 to 10 carbon atoms such as —CH$_3$; and M is any suitable counter anion such as Cl$^-$, BR$^-$, or the like. The term "quaternary ammonium functionality" also would encompass sulfobetaines, (e.g., —N$^+$(CH$_3$)$_2$(CH$_2$CH$_2$CH$_2$SO$_3$)).

In one embodiment, the quaternary ammonium functional polymer is a nonhalogenated vinyl copolymer which is incorporated into the polymeric binder as the so-called "hard resin" component having a relatively high glass transition temperature (T$_g$).

In another embodiment, the nonhalogenated, vinyl copolymer is of the type comprising a plurality of pendant quaternary ammonium groups, a plurality of pendant crosslinkable moieties such as OH groups or moieties having carbon—carbon double bonds, and a plurality of pendant nitrile groups. Without wishing to be bound by theory, it is believed that the nitrile groups may promote the compatibility of these vinyl copolymers with polyurethanes. It is also believed that the pendant hydroxyl groups of the vinyl copolymer not only facilitate dispersion of the magnetic pigment in the polymeric binder, but also promote solubility, cure, and compatibility with other polymers. The quaternary ammonium groups of the vinyl copolymer facilitate dispersion of the magnetic pigment in the polymeric binder.

In yet another embodiment, the quaternary ammonium functional polymer is a quaternary ammonium polyurethane that has at least one quaternary ammonium group pendant from a polyurethane chain of molecular weight greater than about 500.

Another useful non-halogenated vinyl copolymer is one having a plurality of pendant nitrile groups, a plurality of pendant hydroxyl groups, and at least one pendant dispersing group, as described in U.S. Pat. No. 5,501,903 (Erkkila et al.) and 5,510,187 (Kumar et al.), for example. The non-halogenated vinyl copolymer having a plurality of pendant nitrile groups, a plurality of pendant hydroxyl groups, and at least one pendant dispersing group is preferably a nonhalogenated vinyl copolymer of monomers comprising 5 to 40, preferably 15 to 40, parts by weight of (meth)acrylonitrile; 30 to 80 parts by weight of one or more nonhalogenated, nondispersing, vinyl monomers; 1 to 30 parts by weight of a nonhalogenated, hydroxyl functional, vinyl monomer; and 0.25 to 10 parts by weight of a nonhalogenated, vinyl monomer bearing a dispersing group. The dispersing group can be selected from quaternary ammonium, acid or salt of carboxyl, acid or salt of phosphate or phosphonate, acid or salt of sulfate or sulfonate, and mixtures thereof When the dispersing group is quaternary ammonium, it is preferred that the vinyl monomer bearing a dispersing group is (meth)acryloyloxyethyl trimethylammonium chloride.

Preferably, the nonhalogenated, nondispersing, vinyl monomer is selected from styrene; an alkyl ester of (meth)acrylic acid wherein the alkyl group of the alkyl ester has 1 to 20 carbon atoms; and a blend comprising styrene and such an alkyl ester (e.g., methyl (meth)acrylate, more preferably methyl methacrylate) wherein the weight ratio of styrene to the alkyl ester is in the range from 10:90 to 90:10.

Significantly, halogenated vinyl copolymers are also useful, and susceptible to slide coating in accordance with the invention. These include vinyl chloride resins, vinyl chloride-vinyl acetate resins, vinyl chloride-vinyl acetate-vinyl alcohol resins, vinyl chloride-vinyl acetate-maleic anhydride resins, and a combination thereof, such as those described in U.S. Pat. No. 5,763,046 (Ejiri et al.). Preferably, these resins also include one or more polar groups bonded thereto. Preferred polar groups include SO$_3$M$^1$, COO M$^1$, OSO$_3$ M$^1$, P=O(O M$^2$)O M$^3$, —OP=O(O M$^2$)O M$^3$, —NRX, OH, NR$_1$, N$^+$R$_2$ (wherein R is a hydrocarbon group), an epoxy group, SH, and CN. One more useful type of vinyl chloride resin is a vinyl chloride copolymer containing epoxy groups, e.g., a copolymer containing a vinyl chloride repeating unit, an epoxy-containing repeating unit, and, if desired, a polar group-containing unit (e.g., —SO₃M, —OSO₃M, —COOM, and —PO(OM)², wherein M is hydrogen or an alkali metal). Of these, a copolymer containing a repeating epoxy group and a repeating unit containing —SO₃Na are particularly useful.

The polymers mentioned above may be prepared by polymerization methods known in the art, including but not limited to bulk, solution, emulsion and suspension free-radical polymerization methods. For example, according to the solution polymerization method, copolymers are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

A variety of additives known to those skilled in the art can be incorporated into the dispersions and coatings described herein. The dispersions and coatings can further comprise additives including but not limited to those selected from the group consisting of crosslinkers, head-cleaning agents, lubricants, carbon black, dispersants, and wetting agents.

For example, if desired, a binder composition may also include a crosslinker. One preferred type of crosslinker is a polyisocyanate crosslinker known to the magnetic recording media art cure to a glass transition temperature of greater than about 100° C. and may be used to produce layers of high glass transition temperature and hardness. A particularly useful type of polyisocyanate crosslinker is the reaction product of an excess of a diisocyanate with low number average molecular weight (under about 200) diols and triols. A typical and widely used curative comprises, for example the adduct of toluene diisocyanate with a mixture of trimethylol propane and a diol such as butane diol or diethylene glycol. A preferred material of this type is available under the trade designation MONDUR CB-55N from Bayer Corporation. Other useful high Tg crosslinkers are available under the trade designations MONDUR CB-601, MONDUR CB-701, MONDUR MRS, and DESMODUR L (all available from Bayer Corporation) and CORONATE L (available from Nippon Polyurethane). Additional isocyanate crosslinking agents are described in U.S. Pat. No. 4,731,292 (Sasaki et al.).

A toughened polyisocyanate crosslinker which cures to a tough and flexible, rather than a brittle, film may be desirable. Useful toughened polyisocyanate crosslinkers are described in U.S. Pat. No. 5,759,666 (Carlson et al.) and are obtained as the reaction product of an excess of a polyisocyanate with polyols, including 10–80% by weight of an oligomeric polyol which acts as a toughening segment. The oligomeric polyols useful in making toughened polyisocyanate curatives have a number average molecular weight of about 500 to about 5000 and a glass transition temperature of lower than about 0° C., preferably lower than about minus 20° C. The oligomeric polyols are preferably selected from the group consisting of a polyester diols, polyester triols, polyether diols, polyether triols, polycarbonate diols, polycarbonate triols, and mixtures thereof.

One of the preferred toughened polyisocyanate crosslinkers is made from the reaction product of CB-55N (described above), with 45 weight percent of a polycaprolactone diol of 1300 number average molecular weight. This modification of CB-55N provides a faster cure and a tougher coating. It is preferred in formulations in the dispersions and coatings of the invention to use between about 20 and about 60 weight percent, most preferably about 30 to about 50 weight percent of the toughened polyisocyanate curative based upon the weight of formulation solids exclusive of particles.

As mentioned above, other additives include head-cleaning agents, lubricants, carbon black, dispersants, and wetting agents. It is envisioned that lubricants such as those disclosed in U.S. Pat. Nos. 4,731,292 (Sasaki et al.), 4,784,907 (Matsufuji et al.), and 5,763,076 (Ejiri et al.) could be added to obtain desired frictional and processing characteristics. Examples of useful lubricants include but are not limited to those selected from the group consisting of $C_{10}$ to $C_{22}$ fatty acids, $C_1$ to $C_{18}$ alkyl esters of fatty acids, and mixtures thereof Other examples of useful lubricants include those selected from the group consisting of silicone compounds such as silicone oils, fluorochemical lubricants, fluorosilicones, and particulate lubricants such as powders of inorganic or plastic materials. Preferred lubricants include those selected from the group consisting of myristic acid, stearic acid, palmitic acid, isocetyl stearate, oleic acid, and butyl and amyl esters thereof. Typically mixtures of lubricants are used, especially mixtures of fatty acids and fatty esters.

The dispersion may further comprise about 1 to about 10 weight percent of a wetting agent based upon the weight of the magnetic particles. Suitable wetting agents include but are not limited to those selected from the group consisting of phosphoric acid esters such as mono-phosphorylated propylene oxide adducts of glycerol, e.g., the reaction product of 1 mole of phosphorous oxychloride with the reaction product of 10–11 moles of propylene oxide and 1 mole of glycerine.

Examples of useful head cleaning agents include but are not limited to those disclosed in U.S. Pat. Nos. 4,784,914 (Matsufuji et al.) and 4,731,292 (Sasaki et al.). Examples of such head cleaning agents include but are not limited to those selected from the group consisting of alumina, chromium dioxide, alpha iron oxide, and titanium dioxide particles of a size less than about 2 microns, preferably less than 0.5 microns, which have a Mohs hardness of greater than about 5 and which are added in an amount ranging from about 0.2 to about 20 parts per hundred parts of magnetic particles.

As mentioned above, a magnetic layer contains a plurality of magnetic particles. Preferably, the magnetic particles are acicular or needle like magnetic particles. The average length of these particles along the major axis preferably is less than about 0.3 $\mu$m, and more preferably, less than about 0.2 $\mu$m. The particles preferably exhibit an axial ratio, that is, a length to diameter thickness ratio of up to about 5 or 6 to 1. Preferred particles have a specific surface area of at least about 30 m²/g, more preferably of at least about 40 m²/g. Typical acicular particles of this type include, for example, particles of ferro- and ferromagnetic iron oxides such as gamma-ferric oxide ($\gamma$-$Fe_2O_3$), complex oxides of iron and cobalt, various ferrites and metallic iron particles. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art. The magnetic particles can be present in the dispersion in an amount of from about 50% to about 90% by weight, preferably about 60% to about 80% by weight.

A preferred particle is a magnetic alloy particle having high coercivities and high saturation magnetization that preferably include about 15 to 45 atomic %, preferably 20 to 45 atomic percent, Co based on the amount of Fe present (i.e., 100×(atoms of Co/atoms of Fe)). Preferably, these alloy particles have coercivities greater than about 1800 Oerstads (Oe), more preferably, from about 1800 to about 2500 Oe, and even more preferably, about 2000 to about 2400 Oe. The saturation of magnetization of the alloy particles is preferably greater than or equal to 130 emu/g and, more preferably, greater than 135 emu/g. Such metal alloy particles can be prepared by the method described in U.S. Pat. No. 5,735,969 (Lown et al.), and are commercially available from Dowa Mining, Kanto Denka, and Toda Kogyo Corporation, for example.

Magnetic particles for use in the invention may incorporate at least a first surface treatment agent that is desirably adsorbed onto the surfaces of the magnetic pigment. The surface treatment agent is a compound comprising at least one acidic group and at least one electron withdrawing group. Advantageously, the use of a surface treatment agent with this kind of multiple functionality improves the dispersability of magnetic pigments in polymeric binders having quaternary ammonium functionality. As a result, the corresponding magnetic recording media are easier to manufacture and have better electromagnetic and mechanical performance properties than if the surface treatment agent lacked one or both of the acid or electron withdrawing functionalities.

A wide variety of acidic groups may be used as the acidic group of the surface treatment agent of this invention with beneficial results. Representative examples of suitable acidic groups include an anhydric group, a —COOH group, sulfonic acid, a phosphonic acid group, salts of such groups, combinations of these, and the like. Of these, —COOH is presently most preferred in combination with metal particle magnetic pigments. In the practice of the invention, a salt of an acidic group is also deemed to be an acidic group within the scope of the invention.

As used herein, the term "electron-withdrawing" group is a group which, if substituted for a Hydrogen atom (other than the acidic H) on a carboxylic acid would make the acid have a lower pKa, i.e. the functional group has a Hammett Substituent Constant greater than 0.1 as described in *Introduction to Organic Chemistry*, Andrew Streitwieser, Jr. and Clayton H. Heathcock, McMillan Publishing Co., Inc. (NEW YORK, N.Y. 1976) pp. 947–949. Representative examples of electron withdrawing groups include nitro, chloro, bromo, fluoro, iodo, oxo, perfluoroalkyl (such as trifluoromethyl), perfluoroalkoxy, hydroxy, cyano, combinations of these, and the like.

The magnetic layer desirably incorporates a sufficient amount of the surface treatment agent effective to ease dispersion and help prevent agglomeration of the magnetic pigment during preparation of the magnetic recording medium of this invention. The optimum amount of surface treatment agent will depend upon a number of factors including the acid equivalent weight of the surface treatment agent, the specific surface area of the magnetic pigment being surface treated, the pH of magnetic pigment being treated, and the like.

In one preferred embodiment, the surface treatment agent is a compound having the formula

E-X-A wherein E is the electron withdrawing group, A is the acidic group, and X comprises an aromatic moiety. Preferably, X is an aromatic ring, and E and A are substituents of the aromatic ring at meta or para positions relative to each other. More preferably, E and A are at a para position relative to each other. Due to greater spacing between the E and A groups, the surface treatment agent is much more effective when E and A are at a meta or para position relative to each other as compared to the performance of the agent if E and A were to be ortho to each other.

Preferably, the plurality of magnetic particles are first prepared as a concentrated magnetic particle dispersion prior to its addition to the binder. The concentrated magnetic particle dispersion can be prepared by procedures known to those in the dispersion art. The dispersion can be prepared by the use of a dispersing machine, for example, a high speed impeller mill, an attritor, or a sand mill.

The concentrated magnetic particle dispersion can be diluted with a suitable non-aqueous organic solvent to make a magnetic coating composition. Typically, the non-aqueous organic solvent has dissolved or dispersed therein a binder, as described above. Solvents useful for dilution of the concentrated magnetic dispersion include ketones such as acetone, methyl ethyl ketone, methyl isobutyl ketone, cyclohexanone, isophorone; esters such as methyl acetate, ethyl acetate, butyl acetate, isobutyl acetate, isopropyl acetate, ethyl lactate, glycol monoethyl ether acetates; ethers such as diethyl ether, tetrahydrofuran, glycol dimethyl ethers, dioxane; aromatic hydrocarbons such as benzene, toluene, xylene, cresol, chlorobenzene, styrene; chlorinated hydrocarbons such as methylene chloride, ethylene chloride, carbon tetrachloride, chloroform, ethylene chlorohydrin, dichlorobenzene; N,N-dimethylformamide, and hexane.

In some embodiments of the invention, it may be desirable to incorporate the binder described herein in a coating composition that is not required to possess magnetic properties, such as a primer/adhesion promoting layer, an activator layer, a subbing layer (typically located between the magnetic layer and the substrate), and a top layer. For example, a coating composition for forming a subbing layer such as first fluid layer 60 can comprise non-magnetizable particles, such as, for example, those selected from the group consisting of carbon black, alpha-iron oxide, aluminum oxide, titanium dioxide, zinc oxide, silica gel, calcium carbonate, barium sulfate, and mixtures thereof A variety of additives, such as those listed above, may also be incorporated into a non-magnetic layer such as third fluid layer 64. A suitable additive can include head-cleaning agents, lubricants, carbon black, dispersants, wetting agents, and the like.

With fluid layers 60, 62, 64 constructed as described above, slide coating techniques can be used to form a multi-layer construction over substrate 16 with an overall wet coating thickness of less than or equal to approximately 25 micrometers and a substrate thickness of approximately 2 to 8 micrometers at substrate speeds of greater than or equal to 400 feet per minute (120 meters per minute). In some embodiments, substrates speeds may approach or exceed 600 to 850 feet per minute (180 to 260 meters per minute), with a multi-layer wet coating thickness approaching approximately 12 micrometers. In each case, dry thicknesses of the overall coating construction may be in the range of approximately 1 to 3 micrometers. When combined with a substrate thickness of less than or equal to approximately 2 to 8 micrometers, the finished product may have a thickness of approximately 3 to 11 micrometers. Further, the ability to coat multiple layers simultaneously facilitates the dedication of particular functional properties to individual layers.

Magnetic recording performance is significantly impacted by the reduced dry thicknesses of layers 60, 62, 64 and the thickness of substrate 16. With fluid layers 60, 62, 64 formulated as described above, for example, the resulting multi-layer film can be expected to exhibit a coercivity in a direction parallel to the process direction, i.e., the direction of movement of substrate 16, and in a direction perpendicular to the process direction that is sufficient for use according to conventional DLT and SuperDLT magnetic recording specifications. Preferably, the recording layer exhibits squareness, such that the coercivity in the process direction is approximately equal to the coercivity in the direction perpendicular to the process direction.

When organic solvents are used to coat substrate 16, premature drying of the highly evaporative solvent can lead to defects in coating uniformity. Drying of the solvents when the coating solution is still in contact with the surface of the coating apparatus is considered premature drying. Premature drying can cause coating uniformity defects that produce streaks, voids, or bands. Such defects can have a major impact on yields from the coating process because, by their presence, they render the coated substrate unusable. In a die coating environment, there can be a number of locations where the coating solution is relatively stationary and constantly in contact with the surface of the coating apparatus during the entire coating operation. The locations of contact can be referred to as static contact lines. The uniformity of the static contact lines is a major factor governing the quality of the coating and the presence of defects. Control of premature drying at the static contact lines is important.

Figure 8:
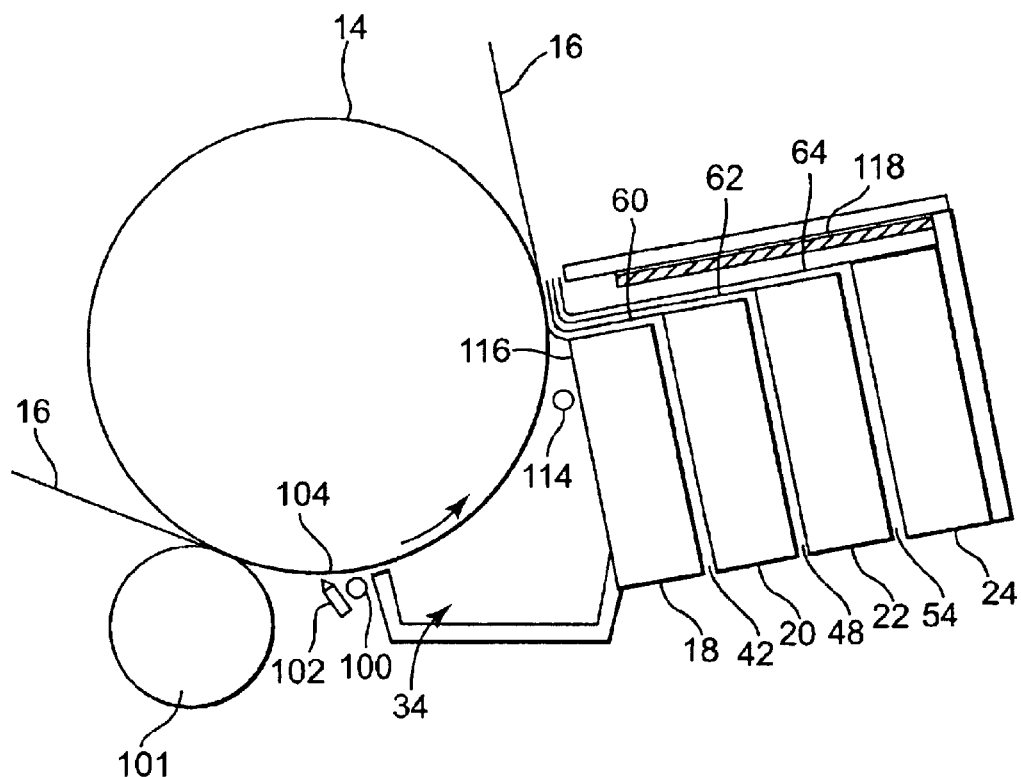
FIG. 8 is a side sectional view of a slide coating apparatus incorporating saturator devices.

FIG. 8 is a side sectional view of a slide coating apparatus incorporating a number of saturator devices. Notably, the various saturator devices are useful not only in a slide coating environment, but in a variety of coating processes such as die coating, curtain coating, slot coating and the like. Therefore, description of such saturator devices in the context of a slide coating system should be considered exemplary and not limiting.

Figure 9:
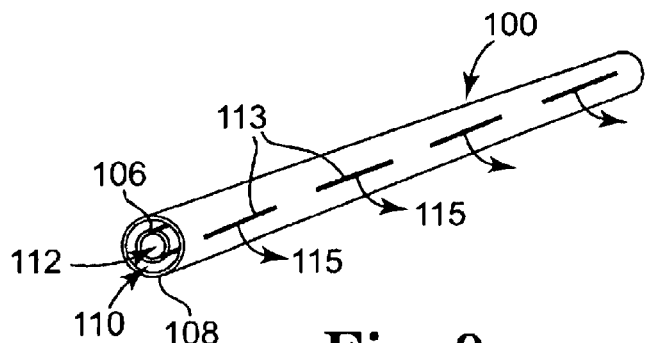
FIG. 9 is a perspective view illustrating a boundary layer saturator device as shown in FIG. 8.
Figure 10:
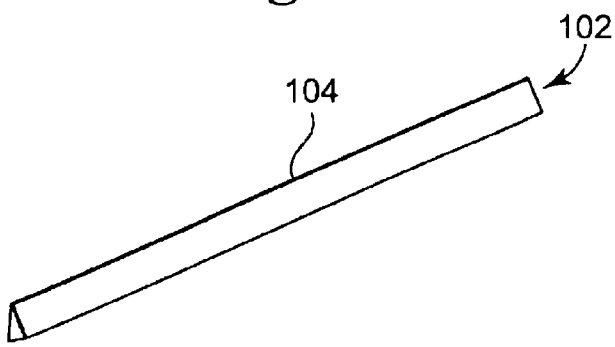
FIG. 10 is a perspective view illustrating a skive blade as shown in FIG. 8.
Figure 11:
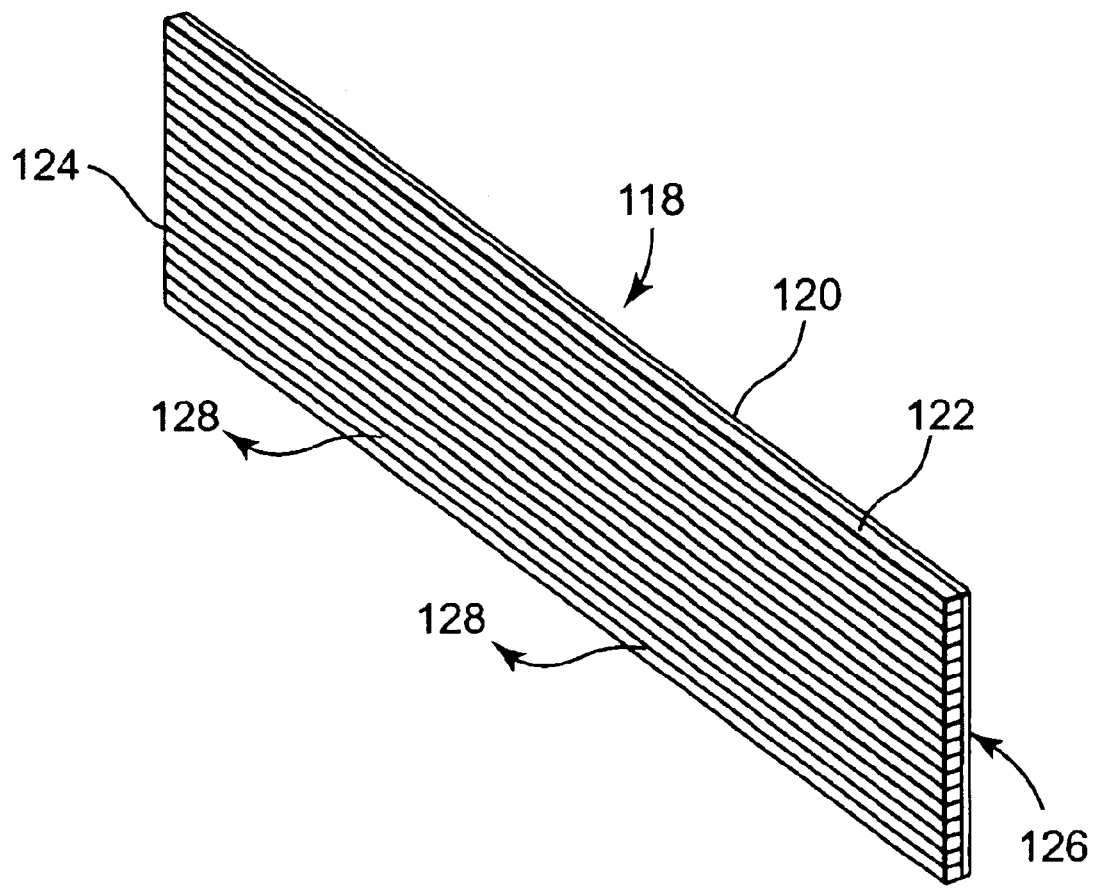
FIG. 11 is a perspective view illustrating a slide surface saturator device as shown in FIG. 8.

FIG. 9 is a perspective view illustrating one saturator device useful as a boundary layer saturator 100 or a slide coater face saturator 114. FIG. 10 illustrates a skive blade 102 useful in removing a boundary layer of substrate 16. FIG. 11 illustrates a slide surface saturator 118. Together, FIGS. 8–11 illustrate a variety of saturator devices useful in promoting a saturated environment in the region proximate the coating bead, and thereby reduce coating defects that can be caused by solvent evaporation and prolong the duration of coating runs. In particular, the coating equipment may need to be cleaned less frequently.

Saturator device 10 serves as a boundary layer saturator. In some embodiments, saturator device 100 may be combined with a boundary layer skive blade 102 having a leading edge 104. A pressure nip roller 101 can be positioned opposite roller 14 and applied against substrate 16 to assist in removal of air from the back surface of the substrate adjacent roll 14. Pressure nip roller 101 may be positioned immediately prior to saturator device 100 and skive blade 102 relative to the direction of travel of substrate 16.

Skive blade 102 may take the form of a blade-like member that extends laterally across the width of substrate 16 and roll 14. Skive blade 102 may be contacting or non-contacting relative to substrate 16, but preferably presents a leading edge 104 that is positioned closely adjacent the surface of substrate 16. A skive blade 102 may not be necessary in embodiments in which saturator device 100 emits solvent vapor with a fluid pressure and velocity sufficient to break up the existing boundary layer, as described below. In some embodiments, an air knife device may be used as an alternative to or in conjunction with skive blade 102.

A number of different saturator structures can be used to realize the function of saturator device 100. For example, saturator device 100 may take the form of a solvent vapor line that feeds a distribution manifold that extends laterally across the width of substrate 16. The vapor line can be coupled at one end to a source of solvent vapor and at the opposite end to the distribution manifold. In this case, the distribution manifold may take the form of an elongated slot that extends laterally across the width of substrate 16 and roller 14.

In the example of FIGS. 8 and 9, however, saturator device 100 takes the form of a concentric tube arrangement. With reference to FIG. 9, in particular, a heated water source is fed through a length of thermally conductive tube 106 to supply energy and thereby promote solvent evaporation in the region adjacent to the tube. A larger tube 108 can be placed concentrically about tube 106 to create an annular space 110 for delivery of solvent.

Heated water distributed through inner space 112 of tube 106 heats the solvent. Thus, the solvent may be metered to the annular space and evaporated by the heated feed tube. Slots 113 in the larger tube 108 can be provided to permit the evaporated solvent to escape in the region of substrate 16, as indicated by arrows 115. The entire apparatus can be located at the entrance to vacuum box 24, prior to the area of the coating gap.

In particular, saturator device 100 may emit vapor in a direction substantially parallel to the surface of substrate 16. In one embodiment, saturator device 100 may take the form of an air knife that emits solvent vapor. In this case, the solvent vapor may be emitted with sufficient pressure to act as an air knife that skives a layer of air carried into the coating gap by substrate 16, and replaces the air layer with solvent vapor. In this case, saturator device 100 may, in effect, perform the additional function of skive blade 102 in removing the boundary layer, such that skive blade 102 is not needed. Alternatively, the solvent vapor may be emitted at a lower pressure, such as in the embodiment of FIG. 9, to intermix with the air layer carried by the surface of substrate 16. In either case, the introduction of solvent vapor is useful in providing a saturated environment that resists drying, and reduces the possibility of drying-induced coating streaks and other defects.

Saturator device 100 is a boundary layer saturator in the sense that it is positioned close to the surface of moving substrate 16 and, in combination with skive blade 102, modifies the boundary layer of air carried at the surface of the substrate. The boundary layer of air is a result of attachment of the air molecules to the surface of the moving substrate 16, which then move at the same velocity of the substrate. Air molecules at a distance from the substrate surface are not attached, and are generally stationary relative to ambient air currents. Between the two sets of air molecules is a boundary layer of air that is moving relative to ambient air currents and travels in the direction of the moving substrate 16. The thickness of the boundary layer is mainly a function of substrate velocity.

The moving substrate 16 delivers the boundary layer of air to the region of the static contact line on the coating apparatus. The boundary layer of air is low in solvent vapor concentration and is moving at a velocity that can cause excessive drying at the static contact line. The boundary layer of air can be removed temporarily using a mechanical device such as skive blade 102, but will quickly reform after passing the mechanical device.

Saturator device 100 serves to replace the unsaturated boundary layer of air with a solvent saturated boundary layer to reduce the ability of the boundary layer to dry the static contact line. In particular, saturator device 100 may be positioned to immediately follow skive 102. In this manner, skive 102 removes or disrupts the boundary layer carried by substrate 16, and saturator device 100 introduces a replacement volume of air that forms a solvent saturated boundary layer.

Saturator device 100 floods the region of the boundary layer with saturated gas so that when the boundary layer reforms, it will reform with solvent saturated gas. The solvent vapor emitted by saturator device 100 need not be completely saturated, but higher vapor concentrations will be more effective in reducing drying. For safety reasons, it may be desirable to choose an inert gas such as nitrogen to carry the solvent vapor.

Another saturator device 114 can be provided within vacuum box 24, adjacent the coating gap. Saturator device 114 may have a structure that conforms substantially to the structure of saturator device 100, and may be positioned to extend laterally across the front face 116 of slide block 18 to provide a saturated solvent environment that retards drying. In other embodiments, saturator device 114 may be realized by a distribution manifold with a slot. Saturator device 114 is oriented to emit solvent vapor into vacuum box 34 at a position proximate face 116 of slide block 18. In this manner, saturator device 114 promotes a saturated environment and avoids drying of solvent on face 116 of slide block 18.

Prior to the start of a slide coating run, flow of the solutions to be coated is ordinarily established on the slide surfaces of the coating apparatus before engagement of the coater with substrate 16. As a result, some of the coating solution flows over the front lip and down the face 116 of the front slide block 18 and is deposited in a collection pan at the bottom of vacuum box 34. When the slide coating apparatus is brought into the coating position, relative to roll 14 and substrate 16, the solution on the slide surface separates from the solution flowing down the face of the front slide bar and is transferred to the moving substrate.

Unfortunately, the solution that was flowing down the face 116 of the slide coater is susceptible to drying. The dried solution is close or adjacent to the lower static contact line, however, increasing the possibility of nonuniformity in the static contact line. This type of nonuniformity can cause banding defects, i.e., formation of nonuniform bands in the coating. A boundary layer saturator 100, as described with reference to FIG. 8, is not always effective in preventing drying of solution that accumulates on the face 116 of the slide coater because the boundary layer is very thin and has little effect except in the area very close to the coating gap. For this reason, it may be desirable to incorporate an additional saturator device. Face saturator 114 creates a saturated environment in the region of the face 116 of the front slide bar to prevent drying of solution and associated banding effects.

In addition to saturator devices 100 and 114, a saturator device 118 may be included in the region adjacent the slide surfaces of slide blocks 18, 20, 22. FIG. 11 is a perspective view of saturator device 118. In the example of FIGS. 8 and 11, saturator device 118 takes the form of a capillary material that acts as a slide surface saturator in the sense that it delivers solvent saturated air to the slide surfaces of the slide coater apparatus adjacent the coating gap. Saturator device 118 of FIGS. 8 and 11 delivers solvent saturated air to the slide surface, reducing drying of solvent that occurs on the slide surface.

The use of a capillary material may be desirable to avoid defects that can be caused by movement of saturated gas across the surface of the coating solution accumulated on the slide surface of the slide coater. Although introduction of saturated vapor can be effective in reducing drying, the movement of the saturated vapor across the slide surface can disrupt the surface of the coating on substrate 16, creating patterns that lead to defects in the coated product. For this reason, the use of a capillary material as the vehicle for solvent transport may be less disruptive and avoid defects in the coated product.

The capillary material may take the form of a sheet 122 that is supported on a baseplate 120. The sheet 122 of capillary material may have small channels 124 that wick solvent from a solvent source to an area proximate the slide coater surface. Alternatively, the sheet 122 of capillary material may take the form of, for example, any porous material including a porous foam material or a piece of absorbent cloth. In each case, the capillary forces, i.e., surface tension, force solvent toward the outer surface of the capillary material, where the solvent evaporates to promote a more saturated environment in the region of the slide coater surface. A number of structural embodiments of saturator 118 are conceivable. With reference to FIGS. 8 and 11, baseplate 120 may be mounted to an interior surface of a hood 119 that encloses the slide coating blocks 18, 20, 22, thereby orienting sheet 122 of capillary material above and immediately adjacent the slide surface.

Baseplate 120 may be mounted to hood 119 using screws, brackets, and the like, or adhesives. In some embodiments, the capillary material may be removably mounted to baseplate 120 or directly to the interior surface of hood 119, e.g., with an adhesive. Also, baseplate 120 or hood 119 may define an area into which the sheet 132 could be inserted, e.g., like an air filter. Solvent may be delivered laterally into the channels 124 of sheet 122 of capillary material, as indicated by arrow 126. The solvent can be delivered using a drip pan or other reservoir into which one end of the sheet 122 of capillary material is positioned. The reservoir is preferably placed remotely from the coating bead. In this manner, the sheet 122 of capillary material wicks the solvent from the reservoir and transports it in a direction toward coating bead. As the solvent evaporates from sheet 122 of capillary material, it increases the saturation of the environment above the slide surfaces, reducing the incidence of drying and associated coating defects.

In some embodiments, a receiving end of the capillary material may be bent downward and inserted into a fluid delivery slot on the slide coating ramp that is not used for coating In the example of FIG. 8, if only two layers are coated and fluid delivery slot 54 is not used for coating, one end of the sheet 122 of capillary material could be inserted into the slot. A controlled level of solvent could be distributed to the fluid delivery slot 54 to deliver fluid to the sheet 122 of capillary material. In addition, in this case, a portion of the sheet 122 of capillary material could rest on the unused slide surface associated with slide block 22 instead of being mounted to hood 119. In any event, the sheet 122 of capillary material wicks solvent toward the coating gap and, upon evaporation of the solvent, promotes a saturated environment near the slide surfaces.

The following is a description of an exemplary formulation exhibiting desirable rheology as described herein. All materials used in this example are readily available from standard commercial sources, unless otherwise specified. All percentages are by weight unless otherwise indicated. The coating formulations are for both a first fluid layer and a second fluid layer to be coated on a substrate to form a magnetic recording medium. The first fluid layer serves as a subbing layer for application to the substrate. The second fluid layer is deposited on top of the subbing layer to form a recording layer. The first fluid layer in this example is formed with the following formulation:

| Solids | Parts per Hundred of Metal Pigment |
|---|---|
| alpha iron oxide (metal pigment) | 100 |
| BP2000 carbon black | 6 |
| Quaternary Ammonium Functional Non-Halogenated Vinyl Copolymer | 17.19 |
| Carboxylic Acid Functional Polyurethane | 8.59 |
| Myristic Acid | 0.5 |
| Butyl Stearate | 1 |
| Toughened Polyisocyanate Curative | 6.44 |

| Solvent Ratio | Concentration |
|---|---|
| Methyl Ethyl Ketone | 20 |
| Methyl Isobutyl Ketone | 45 |
| Tetrahydrofuran | 35 |
| Total | 100 |

The alpha iron oxide can be obtained in a 0.15 micron size from Toda Kogyo Corp. The BP 2000 (Black Pearls 2000) can be obtained from Cabot Corporation. The myristic acid and butyl stearate can both be obtained from Henkel Canada Ltd.

The second fluid layer serves as a recording layer, and is formed with the following formulation:

| Solids | Parts per Hundred of Mag Pigment |
|---|---|
| Magnetic pigment (Hc1830, .1 micron) | 100 |
| Alumina | 19.73 |
| Bp2000 carbon black | 0.5 |
| Quaternary Ammonium Functional Non-Holagenated Vinyl Copolymer | 6.33 |
| Carboxylic Acid Functional Polyurethane | 6 |
| 4-nitrobenzoic acid | 4 |
| Toughened Polyisocyanate Curative | 6.9 |
| Myristic Acid | 0.5 |
| Butyl Stearate | 1 |

| Solvent Ratio | Concentration |
|---|---|
| Methyl Ethyl Ketone | 65 |
| Methyl Isobutyl Ketone | 25 |
| Tetrahydrofuran | 10 |
| Total | 100 |

The magnetic pigment can be obtained from Dowa Mining Co., Ltd. The 4-nitrobenzoic acid can be obtained from Nordic Synthesis AB. The alumina can be obtained from the Ceralox Division of Condea Vista.

In this example, the two fluid layers are coated onto a polyester substrate that is approximately 0.55 mils thick (14 micrometers) and approximately 6.5 inch wide. An example of a suitable substrate is film type PET 6N3AJ, which can be obtained from Toray Corporation.

An example coating window for the two fluid layers is illustrated in Table 1 below. The viscosity is measured at a shear rate of approximately 10,000 $sec^{-1}$ using a Haake viscometer, given the different solids concentrations shown in Table 1. This example represents a coating run carried out at a speed of approximately 600 feet per minute (183 meters per minute) at a typical coating gap G of approximately 7 mils (178 micrometers) and a vacuum box gap of approximately 5 mils (127 micrometers) between the slide lip and roller 14 with applied vacuum levels as indicated in Table 1 across the coating bead. In Table 1, L1 refers to the subbing layer, whereas L2 refers to the recording layer.

TABLE 1

| % L1 Solids | 30.7 | 27.3 | 25.6 | 19.3 |
|---|---|---|---|---|
| L1 Visc. @ 10,000 1/s (cp) | 9.5 | 8 | 6 | 4 |
| Sub. Speed (feet/min) | 600 (183 m/min) | 600 (183 m/min) | 600 (183 m/min) | 600 (183 m/min) |
| L2 Vacuum (in. Water) | 1.1 (2.8 cm) | 0.7 (1.8 cm) | 0.7 (1.8 cm) | 0.4 (1.0 cm) |
| L1 Vacuum (in. Water) | 0.7 (1.8 cm) | 0.3 (.76 cm) | 0.3 (.76 cm) | 0.1 (.25 cm) |
| L2 Wet Thickness ($\mu$in.) | 196 (4.98 $\mu$m) | 196 (4.98 $\mu$m) | 196 (4.98 $\mu$m) | 196 (4.98 $\mu$m) |
| L1 Wet Thickness ($\mu$in.) | 167 (4.24 $\mu$m) | 239 (6.07 $\mu$m) | 239 (6.07 $\mu$m) | 143 (3.63 $\mu$m) |
| Total Wet Thickness ($\mu$in.) | 363 (9.22 $\mu$m) | 424 (10.77 $\mu$m) | 424 (10.77 $\mu$m) | 339 (8.61 $\mu$m) |

Figure 12:
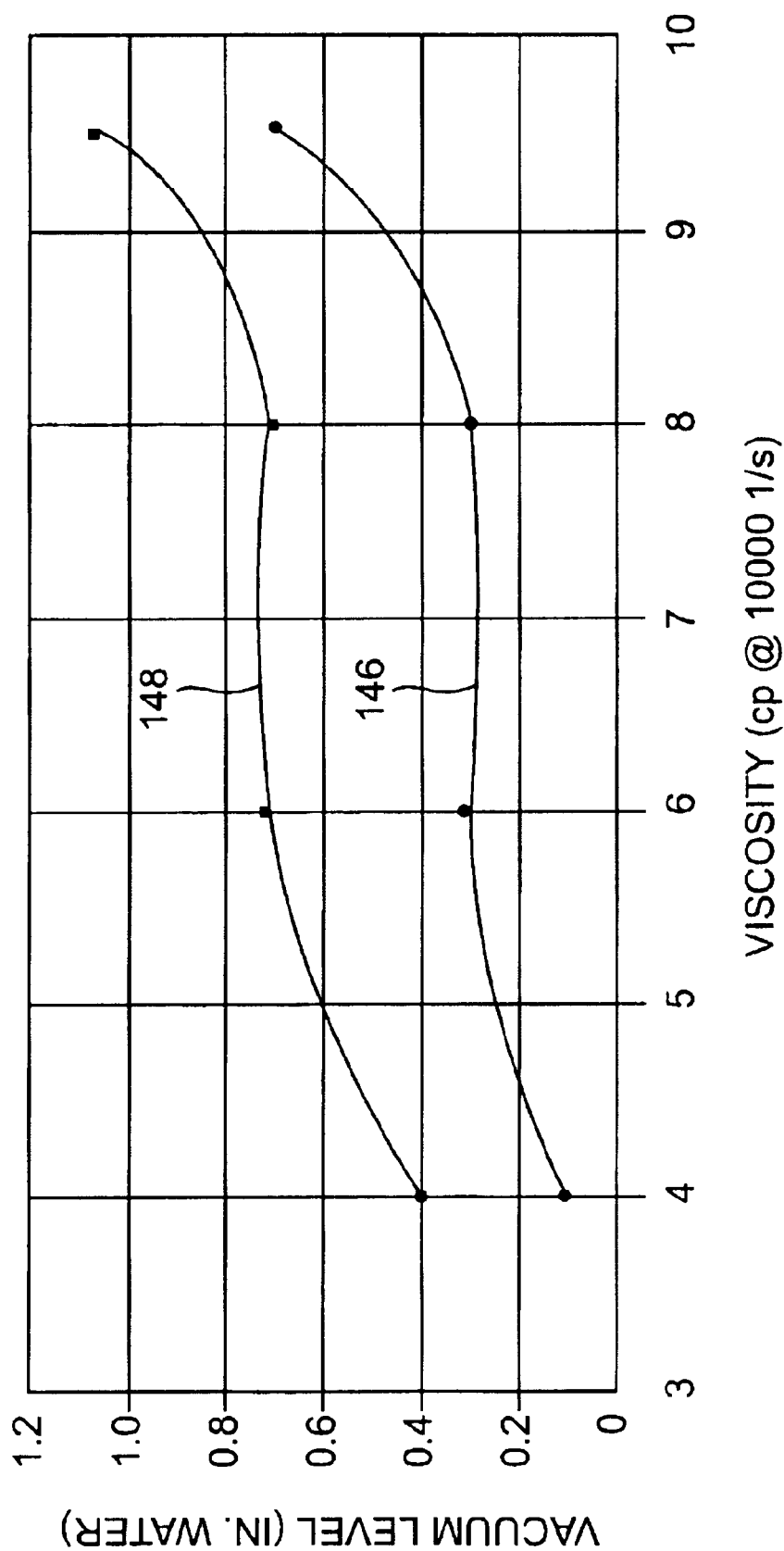
FIG. 12 is a graph illustrating an example coating window for a coating formulation in accordance with the invention.

FIG. 12 is a graph illustrating a coating window for a coating formulation in accordance with the preceding example. The coating window illustrated by FIG. 12 is defined by a lower curve 146 and an upper curve 148, and corresponds to a substrate speed of approximately 600 feet per minute (183 meters per minute). Lower curve 146 and upper curve 148 extend between viscosities of approximately 4 cp and 10 cp, consistent with Table 1, and illustrate the lower and upper bounds for which the vacuum level applied to the vacuum box of a slide coater begins to produce unsuitable coating results.

At approximately 9.5 cp, for example, vacuum levels between approximately 0.7 inches (1.8 cm) and 1.1 inches (2.8 cm) of water were found to produce acceptable coating results. Similarly, as another example, at approximately 6 cp, vacuum levels between approximately 0.3 inches (0.76 cm) and 0.7 inches (1.8 cm) of water were found to produce acceptable coating results. When the vacuum level was greater than the level defined by upper curve 148 or less than the level defined by lower curve 146 for a corresponding viscosity, however, the coating results were deemed unacceptable.

EXAMPLE 1

An objective of this example was to analyze minimum wet layer thickness and coating quality as a function of % solids and web speed. A composition as described above was coated onto a polyethylene terephthalate substrate 22.86 cm wide and 50.8 microns thick. The slide coater setup for all coating conditions and formulations was as follows: slide angle, S, of 25 degrees and position angle, P, of −7 degrees (both with respect to the horizontal). The slide set-up used is shown below in Table 2.

TABLE 2

| Layer | Slot Height (cm) | Step Height (cm) | S (Degrees) | P(Degrees) |
|---|---|---|---|---|
| 1 | 0.0381 | 0.0508 | 25 | −7 |

Five different concentrations (% solids) were coated. The solids adjustment was done with various mixtures of MEK, MIBK, and THF. Solutions were activated with PPA-45 prior to coating. The solution properties for each are shown below in Table 3.

TABLE 3

Coating Solution Physical Properties

| Solution | Concentration (% solids) | Density (A) (g/cm3) | Viscosity for High Shear (B) (cp) | Viscosity for Intermed. Shear (C) (cp) | Viscosity for Low Shear (D) (cp) |
|---|---|---|---|---|---|
| 1 | 5 | 0.859 | 1 | 1 | (*) |
| 2 | 10 | 0.895 | 1 | 4 | (*) |
| 3 | 15 | 0.93 | 1 | 7 | 20 |
| 4 | 20 | 0.969 | 5 | 15 | 52 |
| 5 | 25 | 1.01 | 9 | 30 | 96 |

(A) measured using specific gravity bottle
(B) measured using ICI Viscometer @ shear of 10,000 sec-1
(C) measured using Brookfield DV III+ with Spindle CPE-42 @ shear rate 57.6 sec-1
(D) measured using Brookfield DV III+ with Spindle CPE-42 @ shear rate 3.84 sec-1
(*) measurement outside range of instruments The coating width was 15.24 centimeters. The coating conditions and results are shown below in Table 3. The minimum wet layer thickness, twmin, and minimum dry layer thickness, tdmin, are the minimum attainable for continuous coating for each condition. Coatings were air dried with web stationary.

TABLE 4

Coating Conditions and Results

| Solution | Concentration (% solids) | Web Speed (meters/min) | Twmin (microns) | tdmin (microns) | Coating |
|---|---|---|---|---|---|
| 1(*) | 5 | 91 | 25 | 0.55 | X |
| 2 | 10 | 152 | 32 | 1.50 | X |
| 3 | 15 | 152 | 26 | 1.87 | X |
| 4 | 20 | 152 | 19 | 1.91 | O |
| 5 | 25 | 152 | 17 | 2.30 | O |

Coating Legend: O = Satisfactory Coating, X = Unsatisfactory Coating
(*)Was unable to achieve solution flow rates for speeds higher than 91 meters per minute.

As indicated in Table 4, the coating operation is satisfactory for the higher concentration coating solutions i.e., 20 and 25% solids. It is also evident from Table 4 that the minimum layer thickness decreases with increasing solids concentration. It is also evident from Tables 3 and 4 that higher coating viscosity corresponds to higher solution concentrations. Coating quality was progressively worse going from high to low % solids, e.g., 25% to 5% solids.

EXAMPLE 2

An objective of this example was to analyze minimum wet layer thickness and coating quality for dual layer constructions. The variables are percentage of solids of the individual layers of the two layer construction and web speed. A composition as described above was coated onto a polyethylene terephthalate substrate 22.86 cm wide and 50.8 microns thick. The slide coater setup for all coating conditions and formulations was as follows: slide angle, S, of 25 degrees and position angle, P, of −7 degrees (both with respect to the horizontal). The slide set-up used is shown below in Table 1.

TABLE 5

Slide Coater Set-up

| Layer | Slot Height (cm) | Step Height (cm) | S (Degrees) | P (Degrees) |
|---|---|---|---|---|
| 1 | 0.0254 | 0.0178 | 25 | −7 |
| 2 | 0.0381 | 0.0508 | 25 | −7 |

Four different concentrations (% solids) were coated. Solids adjustment was done with various mixtures of MEK, MIBK, and THF. Solutions were activated with PPA-45 prior to coating. The solution properties for each are shown below in Table 6.

TABLE 6

Coating Solution Physical Properties

| Solution | Conc. (% solids) | Density (A) (g/cm3) | Visc. At High Shear (B) (cp) | Visc. At Intermed. Shear (C) (cp) | Viscosity at Low Shear (D) (cp) |
|---|---|---|---|---|---|
| 1 | 5 | 0.859 | 1 | 1 | (*) |
| 2 | 10 | 0.895 | 1 | 4 | (*) |
| 3 | 20 | 0.969 | 5 | 15 | 52 |
| 4 | 25 | 1.01 | 9 | 30 | 96 |

(A) measured using specific gravity bottle
(B) measured using ICI Viscometer at shear rate of 10,000 sec-1
(C) measured using Brookfield DV III+ with Spindle CPE-42 @ shear rate 57.6 sec-1
(D) measured using Brookfield DV III+ with Spindle CPE-42 @ shear rate 3.84 sec-1
(*) measurement outside range of instrument The coating rate was 152 meters per minute. The coating width was 15.24 centimeters. The coating construction and results are shown below in Table 7. Layer 1 is the undermost layer. For each coating, Layer 1 was minimized while Layer 2 was preset to achieve a desired dry coating thickness of 1.30 microns. Coatings were air dried with the substrate stationary.

TABLE 7

Coating Construction and Results

| Layer 1 Solution | Layer 2 Solution | Layer 1 Twmin (microns) | Layer 2 Tw (microns) | Coating |
|---|---|---|---|---|
| 1 | 3 | 10.1 | 13.5 | X |
| 2 | 3 | 12.4 | 13.5 | X |

TABLE 7-continued

Coating Construction and Results

| Layer 1 Solution | Layer 2 Solution | Layer 1 Twmin (microns) | Layer 2 Tw (microns) | Coating |
|---|---|---|---|---|
| 2 | 4 | 11.3 | 10.5 | X |
| 1 | 4 | 12.4 | 10.5 | X |

Coating Legend:
O Satisfactory Coating,
X Unsatisfactory Coating

As indicated in Table 7, the coating operations did not produce satisfactory coatings, demonstrating the importance of proper rheology, particularly at higher coating speeds.

A number of embodiments of the invention have been described. Nevertheless, it will be understood that various modifications may be made without departing from the spirit and scope of the invention. Other embodiments are within the scope of the following claims.

What is claimed is:

1. A magnetic recording medium comprising:
a substrate;
a first fluid-coated layer formed over the substrate; and
a second fluid-coated layer formed over the first layer using a wet-on-wet multi-layer slide coating process, the second layer containing metal magnetic particles,
wherein the first and second layers are coated with a combined average wet thickness on the substrate of less than approximately 25 micrometers.

2. The magnetic recording medium of claim 1, wherein the first and second layers are coated with a combined average wet thickness on the substrate of approximately 12 to 25 micrometers.

3. The magnetic recording medium of claim 1, wherein the second layer is coated with an average wet thickness of less than approximately 0.4 micrometers.

4. The magnetic recording medium of claim 1, wherein the second layer is coated with an average wet thickness approximately 0.04 to 0.4 micrometers.

5. The magnetic recording medium of claim 1, wherein the substrate has a thickness of less than approximately 8 micrometers.

6. The magnetic recording medium of claim 1, wherein the substrate has a thickness of approximately 2 to 8 micrometers.

7. The magnetic recording medium of claim 1, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate.

8. The magnetic recording medium of claim 1, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate, and wherein the substrate has a thickness of approximately 2 to 8 micrometers.

9. The magnetic recording medium of claim 1, wherein the first layer is substantially free of magnetic material.

10. The magnetic recording medium of claim 1, wherein the first layer has a dry thickness of less than approximately 3 micrometers.

11. The magnetic recording medium of claim 1, wherein the second layer has an average inter-layer roughness of less than approximately 10 nm.

12. The magnetic recording medium of claim 1, wherein the second layer has an average inter-layer roughness of approximately 4 to 10 nm.

13. The magnetic recording medium of claim 1, wherein the substrate, the first layer, and the second layer have a combined dry thickness of less than approximately 11 micrometers.

14. The magnetic recording medium of claim 1, wherein the substrate, the first layer, and the second layer have a combined dry thickness of approximately 3 to 11 micrometers.

15. The magnetic recording medium of claim 1, wherein the coercivity in the direction parallel to the process direction is approximately equal to the coercivity in the direction perpendicular to the process direction.

16. The magnetic recording medium of claim 1, wherein the substrate, the first layer, and the second layer are arranged to form a magnetic recording tape.

17. The magnetic recording medium of claim 1, further comprising a third fluid-coated layer formed over the first layer.

18. The magnetic recording medium of claim 17, wherein the first and second layers have a combined dry thickness of approximately 1 to 3 micrometers.

19. The magnetic recording medium of claim 1, wherein one of the first and second layers includes a lubricant.

20. The magnetic recording medium of claim 1, wherein one of the first and second layers includes an antistatic agent.

21. The magnetic recording medium of claim 1, wherein one of the first and second layers includes a head cleaning agent.

22. The magnetic recording medium of claim 1, wherein the coating formulation includes an abrasive material.

23. A magnetic recording medium comprising:
a substrate;
a first fluid-coated layer formed over the substrate; and
a second fluid-coated layer formed over the first layer using a wet-on-wet multi-layer slide coating process, the second layer containing metal magnetic particles,
wherein the second fluid-coated layer has a wet thickness of less than approximately 3 micrometers.

24. The magnetic recording medium of claim 23, wherein the first and second layers have a combined dry thickness on the substrate of approximately 1 to 3 micrometers.

25. The magnetic recording medium of claim 23, wherein the substrate has a thickness of less than approximately 8 micrometers.

26. The magnetic recording medium of claim 23, wherein the substrate has a thickness of approximately 2 to 8 micrometers.

27. The magnetic recording medium of claim 23, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate.

28. The magnetic recording medium of claim 23, wherein the first layer is substantially free of magnetic material.

29. The magnetic recording medium of claim 23, wherein the first layer has a dry thickness of less than approximately 3 micrometers.

30. The magnetic recording medium of claim 23, wherein the second layer has an average inter-layer roughness of less than approximately 10 nm.

31. The magnetic recording medium of claim 23, wherein the second layer has an average inter-layer roughness of approximately 4 to 10 nm.

32. The magnetic recording medium of claim 23, wherein the substrate, the first layer, and the second layer have a combined dry thickness of less than approximately 11 micrometers.

33. The magnetic recording medium of claim 23, wherein the substrate, the first layer, and the second layer have a combined dry thickness of approximately 3 to 11 micrometers.

34. The magnetic recording medium of claim 23, wherein the coercivity in a direction parallel to the process direction is approximately equal to the coercivity in a direction perpendicular to the process direction.

35. The magnetic recording medium of claim 23, wherein the substrate, the first layer, and the second layer are arranged to form a magnetic recording tape.

36. The magnetic recording medium of claim 23, further comprising a third fluid-coated layer formed over the first layer.

37. The magnetic recording medium of claim 36, wherein the first and second layers have a combined dry thickness of approximately 1 to 3 micrometers.

38. The magnetic recording medium of claim 23, wherein one of the first and second layers includes a lubricant.

39. The magnetic recording medium of claim 23, wherein one of the first and second layers includes an antistatic agent.

40. The magnetic recording medium of claim 23, wherein one of the first and second layers includes a head cleaning agent.

41. The magnetic recording medium of claim 23, wherein the coating formulation includes an abrasive material.

42. A magnetic recording medium comprising:
a substrate;
a first fluid-coated layer formed over the substrate; and
a second fluid-coated layer formed over the first layer using a wet-on-wet multi-layer slide coating process, the second layer containing metal magnetic particles, wherein the second fluid-coated layer has a dry thickness of less than approximately 0.4 micrometers and an average inter-layer roughness of less than approximately 10 nm.

43. The magnetic recording medium of claim 42, wherein the first and second layers have a combined thickness on the substrate of approximately 1 to 3 micrometers.

44. The magnetic recording medium of claim 42, wherein the first layer has a dry thickness of less than approximately 3 micrometers.

45. The magnetic recording medium of claim 42, wherein the first layer has a dry thickness of approximately 1 to 3 micrometers.

46. The magnetic recording medium of claim 42, wherein the substrate has a thickness of less than approximately 8 micrometers.

47. The magnetic recording medium of claim 42, wherein the substrate has a thickness of approximately 2 to 8 micrometers.

48. The magnetic recording medium of claim 42, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate.

49. The magnetic recording medium of claim 42, wherein the first layer is substantially free of magnetic material.

50. The magnetic recording medium of claim 42, wherein the second layer has an average inter-layer roughness of approximately 4 to 10 nm.

51. The magnetic recording medium of claim 42, wherein the substrate, the first layer, and the second layer have a combined dry thickness of less than approximately 11 micrometers.

52. The magnetic recording medium of claim 42, wherein the substrate, the first layer, and the second layer have a combined dry thickness of approximately 3 to 11 micrometers.

53. The magnetic recording medium of claim 42, wherein the coercivity in the direction parallel to the process direction is approximately equal to the coercivity in the direction perpendicular to the process direction.

54. The magnetic recording medium of claim 42, wherein the substrate, the first layer, and the second layer are arranged to form a magnetic recording tape.

55. The magnetic recording medium of claim 42, further comprising a third fluid-coated layer formed over the first layer.

56. The magnetic recording medium of claim 55, wherein the first and second layers have a combined dry thickness of approximately 1 to 3 micrometers.

57. The magnetic recording medium of claim 42, wherein one of the first and second layers includes a lubricant.

58. The magnetic recording medium of claim 42, wherein one of the first and second layers includes an antistatic agent.

59. The magnetic recording medium of claim 42, wherein one of the first and second layers includes a head cleaning agent.

60. The magnetic recording medium of claim 42, wherein the coating formulation includes an abrasive material.

61. A magnetic recording medium comprising:
a substrate;
a fluid-coated first layer formed over the substrate;
a fluid-coated second layer formed over the first layer using a wet-on-wet multi-layer slide coating process, and
a fluid-coated third layer formed over the second layer using a wet-on-wet multi-layer slide coating process, the third layer containing a magnetic material,
wherein the first, second, and third layers have a combined dry thickness of less than approximately 3 micrometers.

62. The magnetic recording medium of claim 61, wherein the first, second, and third layers have a combined dry thickness on the substrate of approximately 1 to 3 micrometers.

63. The magnetic recording medium of claim 61, wherein the first layer has a dry thickness of approximately 1 to 3 micrometers.

64. The magnetic recording medium of claim 61, wherein the substrate has a thickness of less than approximately 8 micrometers.

65. The magnetic recording medium of claim 61, wherein the substrate has a thickness of approximately 2 to 8 micrometers.

66. The magnetic recording medium of claim 65, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate.

67. The magnetic recording medium of claim 61, wherein the first layer is substantially free of magnetic material.

68. The magnetic recording medium of claim 61, wherein the third layer has an average inter-layer roughness of less than approximately 10 nm.

69. The magnetic recording medium of claim 61, wherein the substrate, the first layer, the second layer, and the second layer have a combined dry thickness of less than approximately 11 micrometers.

70. The magnetic recording medium of claim 61, wherein the substrate, the first layer, the second layer, and the third layer have a combined dry thickness of approximately 3 to 11 micrometers.

71. The magnetic recording medium of claim 61, wherein the coercivity in a direction parallel to the process direction is approximately equal to the coercivity in a direction perpendicular to the process direction.

72. The magnetic recording medium of claim 61, wherein the substrate, the first layer, the second layer, and the third layer are arranged to form a magnetic recording tape.

73. The magnetic recording medium of claim 61, wherein one of the first and second layers includes a lubricant.

74. The magnetic recording medium of claim 61, wherein one of the first and second layers includes an antistatic agent.

75. The magnetic recording medium of claim 61, wherein one of the first and second layers includes a head cleaning agent.

76. The magnetic recording medium of claim 61, wherein the coating formulation includes an abrasive material.

77. A magnetic recording medium comprising:
   a substrate having a thickness of less than 8 micrometers;
   a fluid-coated first layer formed over the substrate;
   a fluid-coated second layer formed over the first layer using a wet-on-wet multi-layer slide coating process, and
   a fluid-coated third layer formed over the second layer using a wet-on-wet multi-layer slide coating process, the third layer containing a magnetic material,
      wherein the first, second, and third layers have a combined dry thickness of less than approximately 3 micrometers.

78. The magnetic recording medium of claim 77, wherein the substrate has a thickness of approximately 2 to 8 micrometers.

79. The magnetic recording medium of claim 77, wherein the substrate is formed from a material selected from the group consisting of polyethylene terephalate, polyethylene naphthalate, polyamide, polyimide, polyamide-imide, polysulfone, aramide, polyolefins, cellulose triacetate, and polycarbonate.

* * * * *